(12) United States Patent
Conrad

(10) Patent No.: US 11,641,995 B2
(45) Date of Patent: May 9, 2023

(54) SURFACE CLEANING APPARATUS

(71) Applicant: OMACHRON INTELLECTUAL PROPERTY INC., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 84 days.

(21) Appl. No.: 17/236,859

(22) Filed: Apr. 21, 2021

(65) Prior Publication Data

US 2022/0338694 A1 Oct. 27, 2022

(51) Int. Cl.
*A47L 9/28* (2006.01)
*A47L 5/30* (2006.01)

(52) U.S. Cl.
CPC ............ *A47L 9/2842* (2013.01); *A47L 5/30* (2013.01); *A47L 9/2857* (2013.01); *A47L 9/2873* (2013.01); *A47L 9/2884* (2013.01)

(58) Field of Classification Search
CPC .... A47L 9/2842; A47L 9/2857; A47L 9/2873; A47L 9/2884; A47L 11/4002; A47L 11/4005; A47L 11/4008; A47L 11/4011; H02J 7/0013
USPC .......................................................... 15/339
See application file for complete search history.

(56) References Cited

U.S. PATENT DOCUMENTS

| | | | | |
|---|---|---|---|---|
| 4,969,229 A * | 11/1990 | Svanberg | ............. | A47L 9/2842 15/344 |
| 5,072,484 A * | 12/1991 | Edlund | ................. | A47L 9/2889 15/319 |
| 9,504,364 B2 | 11/2016 | Reed et al. | | |
| 10,568,481 B2 | 2/2020 | Reed et al. | | |
| 10,886,764 B2 | 1/2021 | Kawano et al. | | |
| 2008/0284363 A1* | 11/2008 | Lucas | .................... | A01D 34/78 318/441 |
| 2011/0198103 A1* | 8/2011 | Suzuki | .................. | A47L 9/2884 173/46 |
| 2013/0164589 A1* | 6/2013 | Ota | ..................... | H01M 50/267 429/99 |
| 2013/0293164 A1* | 11/2013 | Sakakibara | ............... | H02P 7/06 318/139 |
| 2015/0145444 A1* | 5/2015 | Reed | ..................... | A47L 9/2878 15/412 |

(Continued)

FOREIGN PATENT DOCUMENTS

| WO | 2013014916 A2 | 1/2013 |
|---|---|---|
| WO | 2013014916 A3 | 7/2013 |

*Primary Examiner* — Joseph J Hail
*Assistant Examiner* — Timothy Brady
(74) *Attorney, Agent, or Firm* — Philip C. Mendes da Costa; Bereskin & Parr LLP/S.E.N.C.R.L., s.r.l.

(57) ABSTRACT

A surface cleaning apparatus has a suction motor actuator that is actuatable to actuate the suction motor to operate in a first mode of operation and to operate in a second mode of operation, the first mode of operation defining a first discrete power level for the suction motor and the second mode of operation defining a second discrete power level for the suction motor. The first mode of operation is enabled when the first power pack having a first level of power is provided to power the surface cleaning apparatus and the second mode of operation is not enabled until a second power pack is provided such that the surface cleaning apparatus has a second level of on board power that is greater than the first level of on board power.

17 Claims, 18 Drawing Sheets

(56) References Cited

U.S. PATENT DOCUMENTS

| | | | |
|---|---|---|---|
| 2016/0174786 A1* | 6/2016 | Conrad | A47L 5/225 |
| | | | 15/329 |
| 2016/0174787 A1* | 6/2016 | Conrad | A47L 5/225 |
| | | | 15/329 |
| 2018/0145616 A1* | 5/2018 | Nakamachi | H02P 6/16 |
| 2020/0168863 A1 | 5/2020 | Reese et al. | |
| 2020/0187741 A1* | 6/2020 | Villaroman | A47L 5/225 |
| 2021/0129190 A1* | 5/2021 | Qiao | B05B 9/0413 |

* cited by examiner

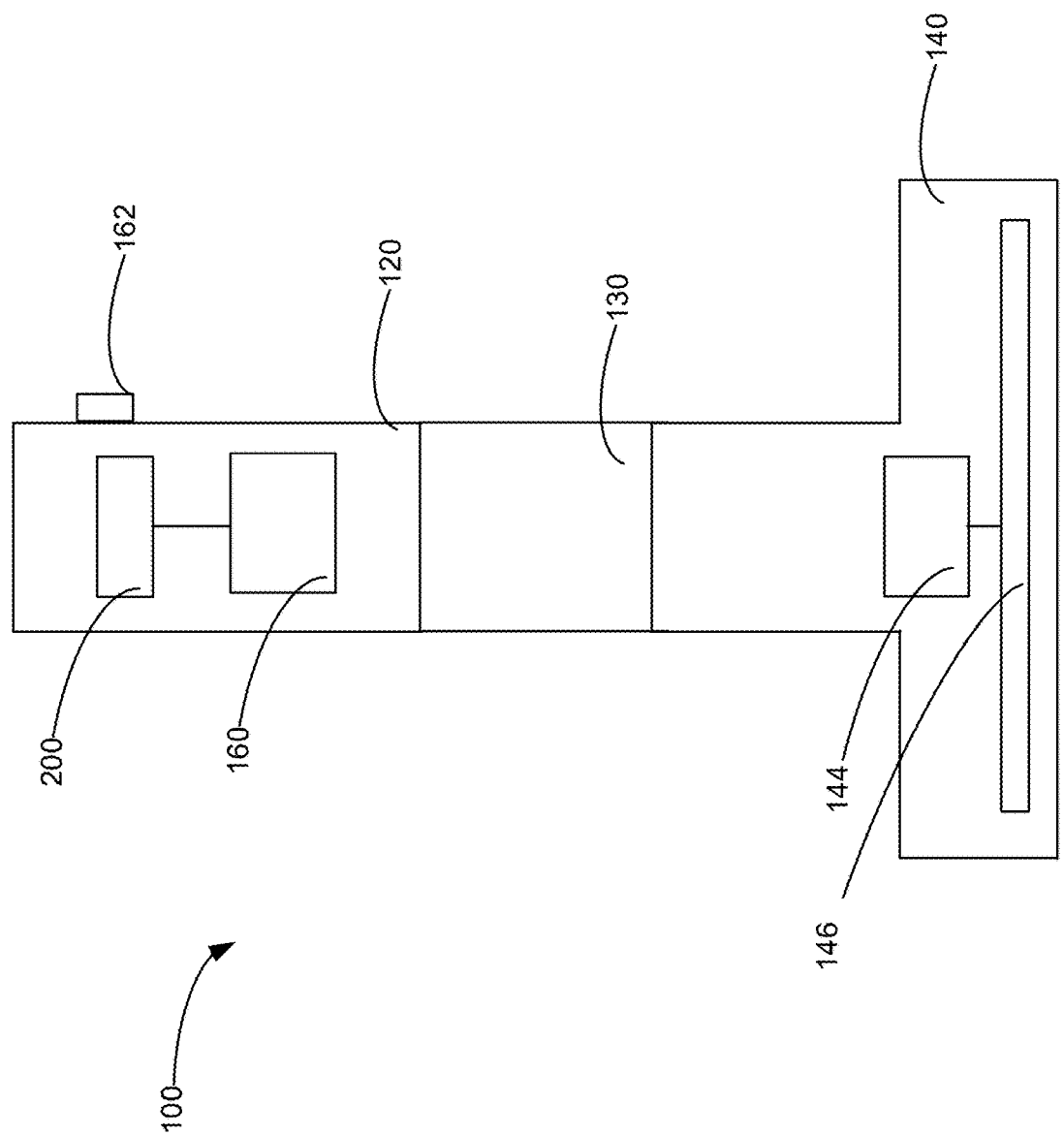

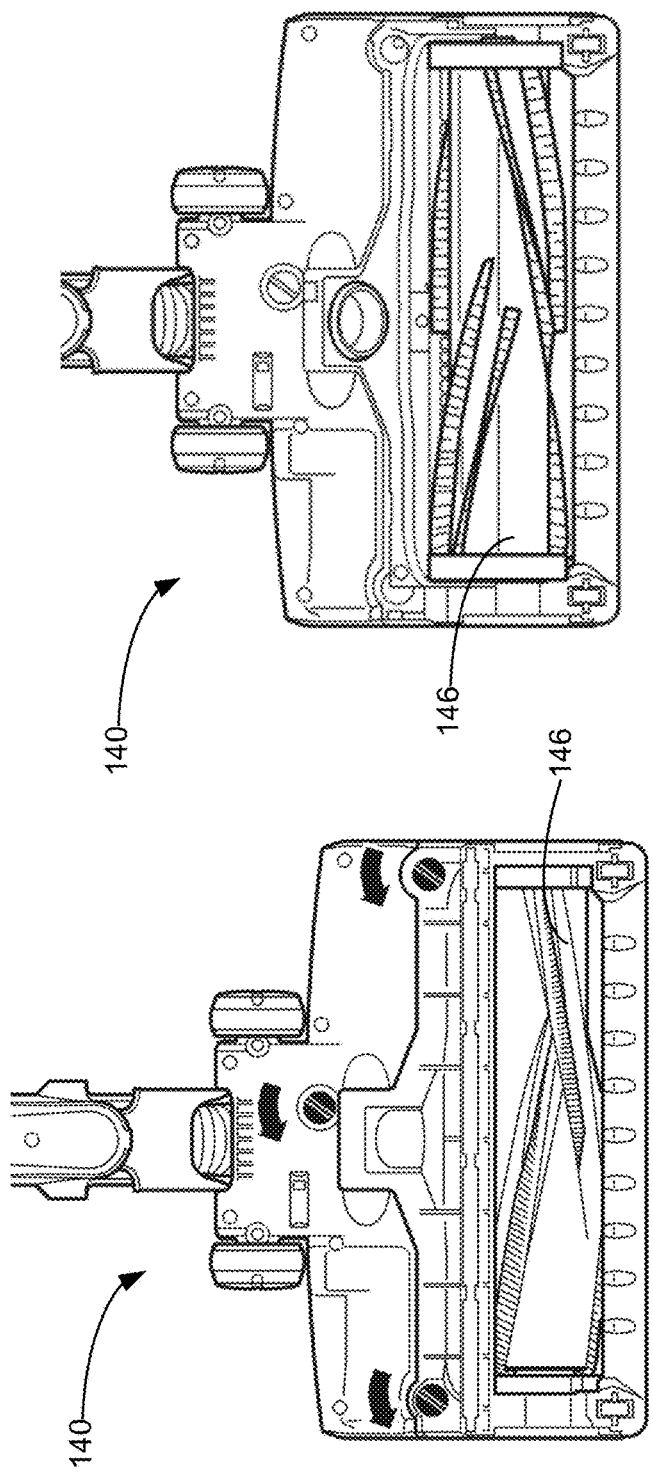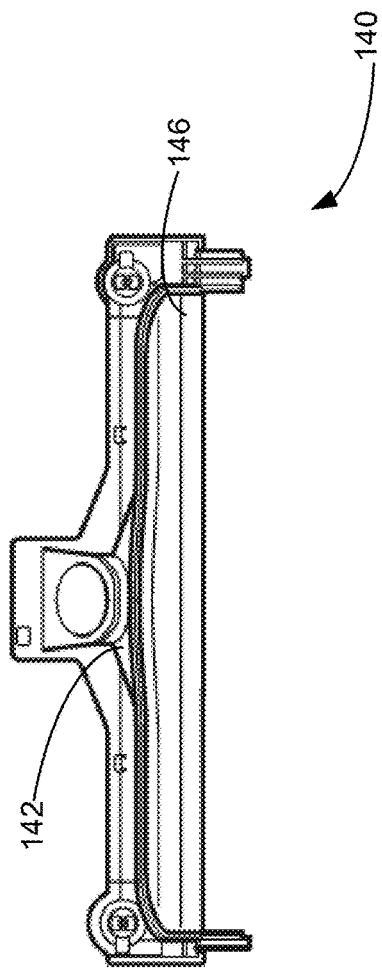
FIG. 3A  FIG. 3B  FIG. 3C

SURFACE CLEANING APPARATUS

FIELD

This application relates to the field of surface cleaning apparatus and power packs for the same.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners, including battery operated cyclonic hand vacuum cleaners, are known in the art.

SUMMARY

Surface cleaning apparatus, such as hand vacuum cleaners may be operable on batteries. Depending upon the number of batteries provided on board a surface cleaning apparatus, the batteries may be the most expensive component of a surface cleaning apparatus and/or the heaviest component. In the design of a surface cleaning apparatus and, in particular, a hand vacuum cleaner, the weight of the product is an important design consideration. At the same time, the performance of the surface cleaning apparatus is dependent upon the available power, i.e., the number of batteries that are provided on board. Any battery pack will provide a certain amount of power. The amount of on board power may be used to produce a higher air flow, so as to provide better cleaning performance. However, this will result in a surface cleaning apparatus having a shorter run time. Conversely, the amount of on board power may be used to provide a longer run time, which will result in a reduced level of air flow and therefore a reduced cleaning performance.

Accordingly, a manufacturer may elect to design a surface cleaning apparatus to have better cleaning performance or a longer run time. The design of any product will be a compromise based on expected consumer preferences.

In accordance with this disclosure, a surface cleaning apparatus may be designed to have different modes of operation depending upon the level of on board power that is provided. Accordingly, the surface cleaning apparatus may be constructed to enable the surface cleaning apparatus to operate in a different mode when more power is provided on board (e.g., a battery pack having a higher level of power is provided and/or a supplemental battery pack is provided). The provision of the additional power may unlock the second mode. Accordingly, for example, a mechanical actuator may be inhibited from move to a particular position until the additional power is provided. In the case of a touch control (e.g., a digital user interface), a particular operating mode control may not be displayed or actuatable until the additional power is provided. The second mode may comprise one or more of a higher power (higher air flow) operating mode, enabling an additional component of the surface cleaning apparatus to operate (e.g., a brush motor), enabling a brush motor to operate at a higher power level, etc.

Accordingly, a user may purchase a surface cleaning apparatus and, if they determine that they require a surface cleaning apparatus with, e.g., a higher power mode, the user may then buy a second battery pack that has a higher level of power than the original battery pack that was provided with the surface cleaning apparatus and/or a supplemental battery pack to enhance the power provided by the original battery pack. The additional on board power then unlocks the higher power mode of operation.

In accordance with one aspect of this disclosure, a surface cleaning apparatus is provided that is powered by one or both of a first power pack and a second power pack. When the second power pack is provided, the surface cleaning apparatus receives a higher level of on board power that enables the user to actuate the suction motor to operate at a higher operating power. An advantage of this design is that the provision of the second power pack enables additional functionality of the surface cleaning apparatus. Accordingly, the user can select the desired operating power of the surface cleaning apparatus to better suit their cleaning needs.

In accordance with this aspect, there is provided a surface cleaning apparatus having an air flow path from a dirty air inlet to a clean air outlet with an air treatment member and a suction motor provided in the air flow path, the surface cleaning apparatus has a suction motor actuator, the suction motor actuator is actuatable to actuate the suction motor to operate in a first mode of operation and to operate in a second mode of operation, the first mode of operation defining a first discrete power level for the suction motor and the second mode of operation defining a second discrete power level for the suction motor, wherein when a first power pack is provided, the first power pack provides a first level of on board power that is available to power the surface cleaning apparatus, and wherein when a second power pack is provided, a second level of on board power is available to power the surface cleaning apparatus, the second level of on board power is greater than the first level of on board power, and wherein the first mode of operation is enabled when the first power pack is provided to power the surface cleaning apparatus and the second mode of operation is not enabled until the second power pack is provided to power the surface cleaning apparatus.

In any embodiment, the first mode of operation may be a low flow mode and the second mode of operation may be high flow mode.

In any embodiment, the first mode of operation may further comprise a medium flow mode between the low flow mode and the high flow mode.

In any embodiment, the suction motor actuator may be a mechanical switch that is moveable between an off position, a first on position in which a first level of power is provided to the suction motor and a second on position in which a second level of power is provided to the suction motor, the second level of power may be greater than the first level of power.

In any embodiment, the suction motor actuator may be moveable to the second on position once the second power pack is provided to power the surface cleaning apparatus.

In any embodiment, the provision of the second power pack may unlock the suction motor actuator whereby the suction motor actuator may be moveable to the second on position.

In any embodiment, the surface cleaning apparatus may further comprise a digital user interface, the digital interface may include the suction motor actuator, and the suction motor actuator may be operable to actuate the first and second modes of operations.

In any embodiment, when the suction motor actuator is pressed a first time and either the first or the second power pack is provided to power the surface cleaning apparatus, the first mode of operation may be actuated, and when the suction motor actuator is pressed a second time and the second power pack is provided to power the surface cleaning apparatus, the second mode of operation may be actuated and the second mode of operation may only be actuatable when the second power pack is provided.

In any embodiment, the first mode of operation may be a low flow mode and the second mode of operation may be a high flow mode.

In any embodiment, the suction motor actuator may comprise a first actuation portion of the user interface and a second actuation portion of the user interface, and the second actuation portion may not be illuminated until the second power pack is provided to power the surface cleaning apparatus.

In any embodiment, the first mode of operation may be a low flow mode that is actuated when the first actuation portion is operated by a user and the second mode of operation may be high flow mode that is actuated when the second actuation portion is operated by the user.

In any embodiment, the second power pack may be removably receivable in the surface cleaning apparatus.

In any embodiment, the second power pack may be removably receivable in the surface cleaning apparatus while the first power pack is provided to power the surface cleaning apparatus.

In any embodiment, the second power pack may provide a third level of on board power that is less than the first level of on board power.

In any embodiment, the surface cleaning apparatus may have a power pack docking station and the power pack docking station may alternately removably receive the first power pack and the second power pack.

In any embodiment, the second power pack may provide the second level of on board power.

In any embodiment, the surface cleaning apparatus may further comprise a controller that may enable the second mode of operation when the second power pack is provided to power the surface cleaning apparatus.

In accordance with another aspect of this disclosure, there is provided a surface cleaning that is powered by one or both of a first power pack and a second power pack. When the second power pack is provided, the surface cleaning apparatus receives a higher level of on board power that enables the operation of a brush motor. An advantage of this design is that the provision of the second power pack enables additional functionality of the surface cleaning apparatus. Accordingly, the user can selectively actuate the brush motor to better suit their cleaning needs.

In accordance with another aspect of this disclosure, a surface cleaning apparatus is provided that is powered by one or both of a first power pack and a second power pack. When the second power pack is provided, the surface cleaning apparatus receives a higher level of on board power that enables the user to actuate a brush motor. An advantage of this design is that the provision of the second power pack enables additional functionality of the surface cleaning apparatus.

In accordance with this aspect, there is provided a surface cleaning apparatus comprising:
a) a surface cleaning head having a dirty air inlet, a moveable brush member and a brush motor drivingly connected to the moveable brush member;
b) an air flow path from the dirty air inlet to a clean air outlet with an air treatment member and a suction motor provided in the air flow path;
c) a suction motor actuator that is operable to actuate the suction motor; and,
d) a brush motor actuator that is operable to actuate a first mode of operation of the brush motor,
wherein when a first power pack is provided, the first power pack provides a first level of on board power that is available to power the surface cleaning apparatus, and
wherein when a second power pack is provided, a second level of on board power is available to power the surface cleaning apparatus, the second level of on board power is greater than the first level of on board power, and
wherein the brush motor actuator is operable when the first power pack is provided to power the surface cleaning apparatus and the brush motor actuator is not enabled to actuate the first mode of operation until the second power pack is provided to power the surface cleaning apparatus.

In any embodiment, the first mode of operation may be an on position whereby when the second power pack is provided to power the surface cleaning apparatus and the brush motor actuator is operated to actuate the first mode of operation, the moveable brush member may be actuated to move.

In any embodiment, the brush motor actuator may be a mechanical switch that is moveable between an off position and the on position in which a first level of power is provided to the brush motor and the brush motor actuator may be moveable to the on position once the second power pack is provided to power the surface cleaning apparatus.

In any embodiment, provision of the second power pack may unlock the brush motor actuator whereby the brush motor actuator may be moveable to the on position.

In any embodiment, the brush motor actuator may also be operable to actuate a second mode of operation of the brush motor wherein the second mode of operation may be a low speed of movement of the moveable brush member and the first mode of operation may be a high speed of movement of the moveable brush member and the brush motor actuator may be operable to actuate the second mode of operation when the second power pack is provided to power the surface cleaning apparatus.

In any embodiment, the brush motor actuator may be a mechanical switch that is moveable between an off position, a first mode of operation on position in which a first level of power is provided to the brush motor and a second mode of operation on position in which a second level of power is provided to the brush motor, the first level of power may be greater than the second level of power, and the brush motor actuator may be moveable to the first mode of operation on position once the second power pack is provided to power the surface cleaning apparatus.

In any embodiment, provision of the second power pack may unlock the brush motor actuator whereby the brush motor actuator may be moveable to the first mode of operation on position.

In any embodiment, the surface cleaning apparatus may further comprise a digital user interface, the digital interface may include the brush motor actuator, and the brush motor actuator may be operable to actuate the first mode of operation once the second power pack is provided to power the surface cleaning apparatus.

In any embodiment, the surface cleaning apparatus may further comprise a digital user interface, the digital interface may include the brush motor actuator, and the brush motor actuator may be operable to actuate the first and second modes of operation wherein:
  when the brush motor actuator is pressed a first time and either the first or the second power pack is provided to power the surface cleaning apparatus, the second mode of operation may be actuated, and
  when the brush motor actuator is pressed a second time and the second power pack is provided to power the surface cleaning apparatus, the first mode of operation may be actuated, and the first mode of operation is only actuatable when the second power pack is provided.

In any embodiment, the brush motor actuator may comprise a first actuation portion of the user interface corresponding to the first mode of operation and a second actuation portion of the user interface corresponding to the second mode of operation, and the first actuation portion may not be illuminated until the second power pack is provided to power the surface cleaning apparatus.

In any embodiment, the second power pack may be removably receivable in the surface cleaning apparatus.

In any embodiment, the second power pack may be removably receivable in the surface cleaning apparatus while the first power pack is provided to power the surface cleaning apparatus.

In any embodiment, the second power pack may provide a third level of on board power that may be less than the first level of on board power.

In any embodiment, the surface cleaning apparatus may have a power pack docking station and the power pack docking station may alternately removably receive the first power pack and the second power pack.

In any embodiment, the second power pack may provide the second level of on board power.

In any embodiment, the surface cleaning apparatus may further comprise a controller that may enable the first mode of operation when the second power pack is provided to power the surface cleaning apparatus.

In accordance with another aspect of this disclosure, there is provided a surface cleaning apparatus that is powered by one or both of a first power pack and a second power pack. When the second power pack is provided, the surface cleaning apparatus receives a higher level of on board power that enables the rate of flow of at least one of a low mode and a high mode of a suction motor to be increased. An advantage of this design is that the user can increase the operating power of the surface cleaning apparatus.

In accordance with this aspect, there is provided a surface cleaning apparatus having an air flow path from a dirty air inlet to a clean air outlet with an air treatment member and a suction motor provided in the air flow path, the surface cleaning apparatus has a suction motor actuator, and the suction motor actuator is actuatable to actuate the suction motor to operate in a low mode of operation and to operate in a high mode of operation,
  wherein when a first power pack is provided, the first power pack provides a first level of on board power that is available to power the surface cleaning apparatus, and
  wherein when a second power pack is provided, a second level of on board power is available to power the surface cleaning apparatus, the second level of on board power is greater than the first level of on board power, and
  wherein each of the low and high modes of operation are enabled when the first power pack is provided to power the surface cleaning apparatus and when the second power pack is provided to power the surface cleaning apparatus, and
  when the second power pack is provided to power the surface cleaning apparatus, an operating power level provided to the suction motor during at least one of the low and high modes of operation is increased.

In any embodiment, when the second power pack is provided to power the surface cleaning apparatus, the operating power level provided to the suction motor during each of the low and high modes of operation may be increased.

In any embodiment, when the first power pack is provided to power the surface cleaning apparatus, the suction motor may produce a low rate of flow in the low mode of operation and suction motor may produce a high rate of flow in the high mode of operation, and when the second power pack is provided to power the surface cleaning apparatus, at least one of the low rate of flow and the high rate of flow may be automatically increased.

In any embodiment, when the first power pack is provided to power the surface cleaning apparatus, the suction motor may produce a low rate of flow in the low mode of operation and suction motor may produce a high rate of flow in the high mode of operation, and when the second power pack is provided to power the surface cleaning apparatus, each of the low rate of flow and the high rate of flow may be automatically increased.

In any embodiment, the second power pack may be removably receivable in the surface cleaning apparatus.

In any embodiment, the second power pack may be removably receivable in the surface cleaning apparatus while the first power pack is provided to power the surface cleaning apparatus.

In any embodiment, the second power pack may provide a third level of on board power that may be less than the first level of on board power.

In any embodiment, the surface cleaning apparatus may have a power pack docking station and the power pack docking station may alternately removably receive the first power pack and the second power pack.

In any embodiment, the second power pack may provide the second level of on board power.

In any embodiment, the surface cleaning apparatus may further comprise a controller that may enable the operating power level provided to the suction motor during at least one of the low and high modes of operation to be increased when the second power pack is provided to power the surface cleaning apparatus.

In accordance with another aspect of this disclosure, there is provided a surface cleaning apparatus that is powered by one or both of a first power pack and a second power pack. When the second power pack is provided, the surface cleaning apparatus receives a higher level of on board power that enables a brush motor to operate at higher speeds. An advantage of this design is that the user can select the desired operating speed of the brush motor in the surface cleaning apparatus to better suit their cleaning needs.

In accordance with this aspect, there is provided a surface cleaning apparatus comprising:
  a) a surface cleaning head having a dirty air inlet, a moveable brush member and a brush motor drivingly connected to the moveable brush member;

b) an air flow path from the dirty air inlet to a clean air outlet with an air treatment member and a suction motor provided in the air flow path;
c) a suction motor actuator that is operable to actuate the suction motor; and,
d) a brush motor actuator that is operable to actuate a low speed mode of operation of the brush motor and to actuate a high speed mode of operation of the brush motor, wherein when a first power pack is provided, the first power pack provides a first level of on board power that is available to power the surface cleaning apparatus, and wherein when a second power pack is provided, a second level of on board power is available to power the surface cleaning apparatus, the second level of on board power is greater than the first level of on board power, and wherein each of the low and high speed modes of operation are enabled when the first power pack is provided to power the surface cleaning apparatus and when the second power pack is provided to power the surface cleaning apparatus, and when the second power pack is provided to power the surface cleaning apparatus, an operating power level provided to the brush motor during at least one of the low and high speed modes of operation is increased.

In any embodiment, when the second power pack is provided to power the surface cleaning apparatus, the operating power level provided to the brush motor during each of the low and high speed modes of operation may be increased.

In any embodiment, when the second power pack is provided to power the surface cleaning apparatus, a speed of movement of the moveable brush member in at least one of the low speed mode of operation and the high speed mode of operation may be automatically increased.

In any embodiment, when the second power pack is provided to power the surface cleaning apparatus, a speed of movement of the moveable brush member in each of the low speed mode of operation and the high speed mode of operation may be automatically increased.

In any embodiment, the second power pack may be removably receivable in the surface cleaning apparatus.

In any embodiment, the second power pack may be removably receivable in the surface cleaning apparatus while the first power pack is provided to power the surface cleaning apparatus.

In any embodiment, the second power pack may provide a third level of on board power that may be less than the first level of on board power.

In any embodiment, the surface cleaning apparatus may have a power pack docking station and the power pack docking station may alternately removably receive the first power pack and the second power pack.

In any embodiment, the second power pack may provide the second level of on board power.

In any embodiment, the surface cleaning apparatus may further comprise a controller that may enable the operating power level provided to the brush motor during at least one of the low speed mode of operation and the high speed mode of operation to be increased when the second power pack is provided to power the surface cleaning apparatus.

In accordance with another aspect of this disclosure, there is provided a surface cleaning apparatus that is powered by one or both of a first power pack and a second power pack. When the second power pack is provided, the surface cleaning apparatus receives a higher level of on board power that enables the operation of a power level adjustment controller. An advantage of this design is that the power level adjustment controller may be used to adjust the operating power of a suction motor. Accordingly, the user can select the desired operating power of the surface cleaning apparatus to better suit their cleaning needs.

In accordance with this aspect, there is provided a surface cleaning apparatus having an air flow path from a dirty air inlet to a clean air outlet with an air treatment member and a suction motor provided in the air flow path, the surface cleaning apparatus has a suction motor actuator, and the suction motor actuator is actuatable to actuate the suction motor to operate in a low mode of operation and to operate in a high mode of operation, wherein when a first power pack is provided, the first power pack provides a first level of on board power that is available to power the surface cleaning apparatus, and wherein when a second power pack is provided, a second level of on board power is available to power the surface cleaning apparatus, the second level of on board power is greater than the first level of on board power, and wherein each of the low and high modes of operation are enabled when the first power pack is provided to power the surface cleaning apparatus and when the second power pack is provided to power the surface cleaning apparatus, and wherein a power level adjustment controller is provided and, when the second power pack is provided to power the surface cleaning apparatus, the power level adjustment controller is adjustable by a user whereby an operating power level provided to the suction motor during at least one of the low and high modes of operation is adjustable by the user.

In any embodiment, when the second power pack is provided to power the surface cleaning apparatus, the operating power level provided to the suction motor during each of the low and high modes of operation may be adjustable by the user.

In any embodiment, when the first power pack is provided to power the surface cleaning apparatus, the suction motor may produce a low rate of flow in the low mode of operation and suction motor may produce a high rate of flow in the high mode of operation, and when the second power pack is provided to power the surface cleaning apparatus, at least one of the low rate of flow and the high rate of flow may be adjustable by the user.

In any embodiment, when the first power pack is provided to power the surface cleaning apparatus, the suction motor may produce a low rate of flow in the low mode of operation and suction motor may produce a high rate of flow in the high mode of operation, and when the second power pack is provided to power the surface cleaning apparatus, each of the low rate of flow and the high rate of flow may be adjustable by the user.

In any embodiment, the power level adjustment controller may be adjustable between a plurality of positions whereby the user may selectively adjust an amount by which the operating power level is increased.

In any embodiment, the surface cleaning apparatus may further comprise a user interface which may provide run time and power level information to the user whereby, when the second power pack is provided to power the surface cleaning apparatus, the power level adjustment controller may be selectively operably by the user to adjust at least one of the power level and the run time.

In any embodiment, the second power pack may be removably receivable in the surface cleaning apparatus.

In any embodiment, the second power pack may be removably receivable in the surface cleaning apparatus while the first power pack is provided to power the surface cleaning apparatus.

In any embodiment, the second power pack may provide a third level of on board power that may be less than the first level of on board power.

In any embodiment, the surface cleaning apparatus may have a power pack docking station and the power pack docking station may alternately removably receive the first power pack and the second power pack.

In any embodiment, the second power pack may provide the second level of on board power.

In accordance with another aspect of this disclosure, there is provided a surface cleaning apparatus that is powered by one or both of a first power pack and a second power pack. When the second power pack is provided, the surface cleaning apparatus receives a higher level of on board power that enables the operation of a power level adjustment controller. An advantage of this design is that the power level adjustment controller may be used to adjust the operating power of a brush motor. Accordingly, the user can select the desired operating power of the brush motor to better suit their cleaning needs.

In accordance with this aspect, there is provided a surface cleaning apparatus comprising:
  a) a surface cleaning head having a dirty air inlet, a moveable brush member and a brush motor drivingly connected to the moveable brush member;
  b) an air flow path from the dirty air inlet to a clean air outlet with an air treatment member and a suction motor provided in the air flow path;
  c) a suction motor actuator that is operable to actuate the suction motor; and,
  d) a brush motor actuator that is operable to actuate a low speed mode of operation of the brush motor and to actuate a high speed mode of operation of the brush motor, the brush motor produces a low speed rate of motion of the moveable brush member in the low speed mode of operation and brush motor produces a high speed rate of motion of the moveable brush member in the high speed mode of operation
  wherein when a first power pack is provided, the first power pack provides a first level of on board power that is available to power the surface cleaning apparatus, and wherein when a second power pack is provided, a second level of on board power is available to power the surface cleaning apparatus, the second level of on board power is greater than the first level of on board power, and
  wherein each of the low speed and high speed modes of operation are enabled when the first power pack is provided to power the surface cleaning apparatus and when the second power pack is provided to power the surface cleaning apparatus, and
  wherein a power level adjustment controller is provided and, when the second power pack is provided to power the surface cleaning apparatus, the power level adjustment controller is adjustable by a user whereby an operating power level provided to the brush motor during at least one of the low speed and high speed modes of operation is adjustable by the user.

In any embodiment, when the second power pack is provided to power the surface cleaning apparatus, the operating power level provided to the brush motor during each of the low speed and high speed modes of operation may be adjustable by the user.

In any embodiment, when the second power pack is provided to power the surface cleaning apparatus, each of the low speed rate of motion and the high speed rate of motion may be adjustable by the user.

In any embodiment, the power level adjustment controller may be adjustable between a plurality of positions whereby the user may selectively adjust an amount by which the operating power level is increased.

In any embodiment, the surface cleaning apparatus may further comprise a user interface which may provide run time and power level information to the user whereby, when the second power pack is provided to power the surface cleaning apparatus, the power level adjustment controller may be selectively operably by the user to adjust at least one of the power level and the run time.

In any embodiment, the second power pack may be removably receivable in the surface cleaning apparatus.

In any embodiment, the second power pack may be removably receivable in the surface cleaning apparatus while the first power pack is provided to power the surface cleaning apparatus.

In any embodiment, the second power pack may provide a third level of on board power that is less than the first level of on board power.

In any embodiment, the surface cleaning apparatus may have a power pack docking station and the power pack docking station may alternately removably receive the first power pack and the second power pack.

In any embodiment, the second power pack may provide the second level of on board power.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 2 is a schematic view of the surface cleaning apparatus of FIG. 1A;

FIG. 3A is a bottom view of a surface cleaning head;

FIG. 3B is a bottom view of the surface cleaning head of FIG. 3A with a bottom panel removed;

FIG. 3C is a rear view of the surface cleaning head of FIG. 3A;

Figure 1B:
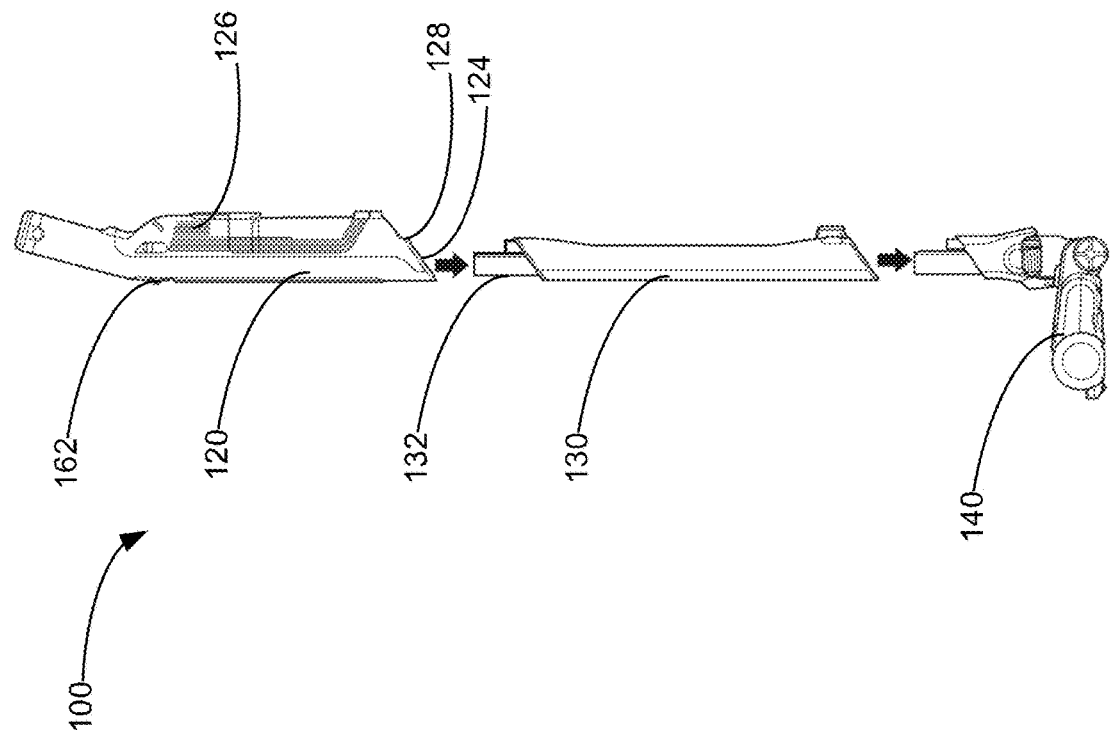
FIG. 1B is an exploded side view of the surface cleaning apparatus of FIG. 1A.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

As used herein and in the claims, two elements are said to be "parallel" where those elements are parallel and spaced apart, or where those elements are collinear.

General Description of a Vacuum Cleaner

Figure 1A:
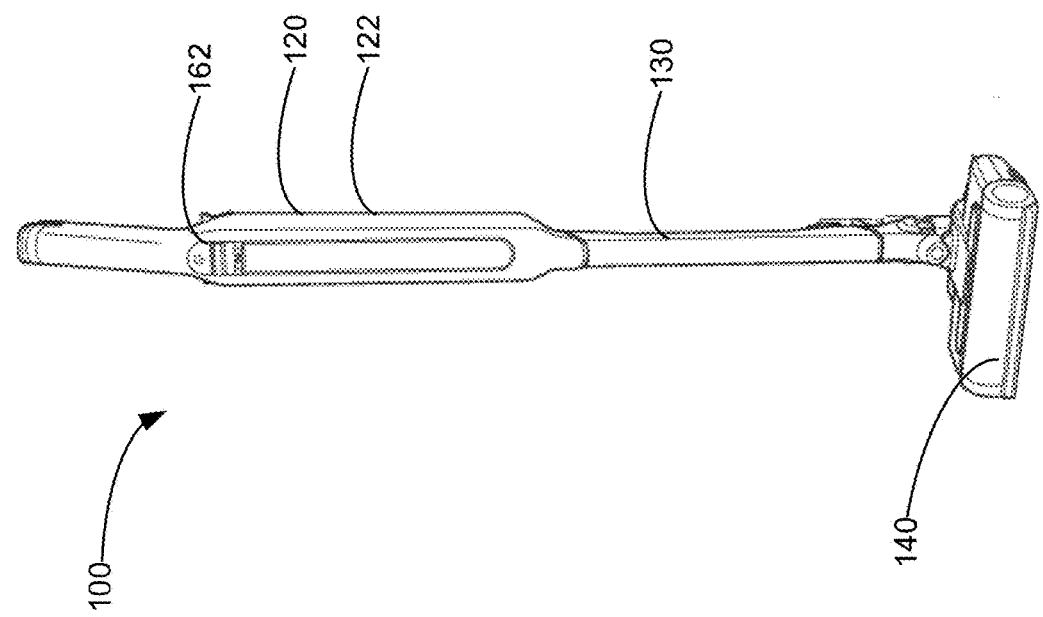
FIG. 1A is a front perspective view of a surface cleaning apparatus in accordance with an embodiment.

Referring to FIGS. 1A-1B, an exemplary embodiment of a surface cleaning apparatus is shown generally as 100. The following is a general discussion of apparatus 100, which provides a basis for understanding several of the features that are discussed herein. As discussed subsequently, each of the features may be used individually or in any particular combination or sub-combination in this or in other embodiments disclosed herein.

Surface cleaning apparatus 100 may be any type of surface cleaning apparatus, including for example a stick vacuum cleaner as shown, a hand vacuum cleaner, an upright vacuum cleaner (which may optionally have a lift away cleaning unit that has one or more air cleaning members and a suction motor), a canister vacuum cleaner, an extractor, or a wet/dry type vacuum cleaner.

In FIGS. 1A-2, the surface cleaning apparatus 100 is illustrated as a stick vacuum cleaner. As exemplified, the stick vacuum cleaner includes a portable cleaning unit, which may also be referred to as a "hand vacuum cleaner", a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. This is to be contrasted with canister and upright vacuum cleaners, whose weight is typically supported by a surface (e.g., a floor) during use. When a canister vacuum cleaner is operated, or when an upright vacuum cleaner is operated in a 'lift-away' configuration, a second hand is typically required to direct the dirty air inlet at the end of a flexible hose.

Referring to FIGS. 1A-2, surface cleaning apparatus 100 includes a portable cleaning unit 120 having a main body or a handvac body 122 having an air treatment member (which may be permanently affixed to the main body or may be removable in part or in whole therefrom for emptying), a dirty air inlet 124, a clean air outlet 126, and an air flow path extending between the dirty air inlet 124 and the clean air outlet 126. It will be appreciated that dirty air inlet 124 and clean air outlet 126 may be positioned in different locations of apparatus 100.

A suction motor 160 is provided to generate vacuum suction through air flow path. Suction motor 160 may be a fan-motor assembly including an electric motor and impeller blade(s). An air treatment member (not shown) is configured to remove particles of dirt and other debris from the air flow. The air treatment member may comprise a cyclone assembly (also referred to as a "cyclone bin assembly") having a single cyclonic cleaning stage with a single cyclone and a dirt collection chamber that is external to the cyclone (also referred to as a "dirt collection region", "dirt collection bin", "dirt bin", or "dirt chamber"). The cyclone and dirt collection chamber may be of any configuration suitable for separating dirt from an air stream and collecting the separated dirt respectively, and may be in communication dirt outlet(s) of the cyclone chamber.

In alternate embodiments, the air treatment member may include a cyclone assembly having two or more cyclonic cleaning stages arranged in series with each other. Each cyclonic cleaning stage may include one or more cyclones arranged in parallel with each other and one or more dirt collection chambers, of any suitable configuration. The dirt collection chamber(s) may be external to the cyclone chambers of the cyclones or internal of the cyclone chamber. Each cyclone may have its own dirt collection chamber or two or more cyclones fluidically connected in parallel may have a single common dirt collection chamber. Alternately, any other air treatment member known in the art, such as a bag or a non-cyclonic momentum separator may be used.

The hand vacuum cleaner 120 may include a pre-motor filter provided in the air flow path downstream of the air treatment member and upstream of suction motor 160. The pre-motor filter may be formed from any suitable physical, porous filter media. For example, the pre-motor filter may be one or more of a foam filter, felt filter, HEPA filter, or other physical filter media. In some embodiments, the pre-motor filter may include an electrostatic filter, or the like. The pre-motor filter may be located in a pre-motor filter housing that is external to the air treatment member.

In the illustrated embodiments, dirty air inlet 124 is the inlet end of an air inlet conduit 128. Optionally, the inlet end of air inlet conduit 128 can be used as a nozzle to directly clean a surface. Alternatively, or in addition to functioning as a nozzle, air inlet conduit 128 may be connected (e.g., directly connected) to the downstream end of any suitable accessory tool such as a rigid air flow conduit (e.g., an above floor cleaning wand), a crevice tool, a mini brush, and the like. For example, as exemplified in FIG. 1B, the air inlet conduit 128 of the hand vacuum cleaner 120 is connectable to a wand 130. The wand 130 may be used to extend the reach of the hand vacuum cleaner 120. As exemplified, the wand 130 may provide an air flow conduit 132 for connecting the hand vacuum cleaner 120 to a surface cleaning head 140, having a dirty air inlet 142. In some embodiments, the hand vacuum cleaner 120 may be directly connectable to the surface cleaning head 140. In some embodiments, the wand 130 may be a separate accessory for lengthening the air inlet conduit 128 of the hand vacuum cleaner 120 and may not be in air flow communication with the surface cleaning head 140.

It will be appreciated that the surface cleaning head 140 may be any type of surface cleaning head. For example, the surface cleaning head 140 may be a dry cleaning head as exemplified, or may be a wet cleaning head such as a wet mop cleaning head.

Accordingly, in operation, after activating the suction motor 160, dirty air enters apparatus 100 through dirty air inlet 124 and is directed along air inlet conduit 128 to the air treatment member. Dirt particles and other debris may be disentrained (i.e., separated) from the dirty air flow as the dirty air flow travels through the air treatment member. The disentrained dirt particles and debris may be discharge from the air treatment member into the dirt collection chamber, in which the dirt particles and debris may be collected and stored until the dirt collection chamber is emptied.

Air exiting the air treatment member may be directed through the pre-motor filter, and then travel to the suction motor 160 and may then be subsequently discharged from apparatus 100 through clean air outlet 126. Prior to exiting the clean air outlet 126, the treated air may pass through a post-motor filter, which may be one or more layers of filter media.

Power may be supplied to the suction motor 160 and other electrical components of apparatus 100 from an on board energy storage member, also referred to as a power pack, which may include, for example, one or more batteries or other energy storage device such as a capacitor. As discussed herein a battery pack may comprise one or more energy storage members, such as one or more batteries and/or one or more capacitors, which may be enclosed in a housing.

Suction Motor Actuator

In accordance with this aspect, which may be used by itself or in combination with one or more other aspects, the surface cleaning apparatus 100 has a motor and fan assembly that is operable in one or more additional power or flow modes when additional on board power is provided. Accordingly, for example, a user may be able to upgrade their, e.g., hand vacuum cleaner, to have a high power mode by inserting a supplemental battery pack or replacing the original battery pack with a higher powered battery pack.

For example, a surface cleaning apparatus may have a suction motor actuator (which could be mechanical or digital), for changing a mode of operation of the suction motor from, e.g., a low power mode to a high power mode wherein the higher power mode of operation of the suction motor is enabled by the inclusion of one or more power supplemental battery packs and/or inserting an alternate higher powered battery pack. The power packs vary (e.g., increase) the level of on board power available to the surface cleaning apparatus. Depending on the provided level of on board power, different modes of operation of the suction motor may be enabled or disabled. An advantage of this aspect is that the provision of more power packs, or a power pack of greater capacity, may be used to enable different modes of operation of the suction motor. Accordingly, a user may upgrade the surface cleaning apparatus 100 to have a higher level of on board power to improve the operation of the surface cleaning apparatus 100. For example, the inclusion of a larger capacity power pack may enable the suction motor to operate in a higher flow mode, thereby improving the efficiency of the surface cleaning apparatus 100. Alternately, the suction motor may be operable on a medium power mode when the on board power is upgraded to a first higher power level and a high power mode when the on board power is upgraded to a second higher power level.

Referring to FIG. 2, the surface cleaning apparatus 100 has a suction motor 160 and a suction motor actuator 162. The suction motor actuator 162 is actuatable to actuate the suction motor 160 to operate in different modes of operation. For example, the suction motor 160 may operate in a first mode of operation and a second mode of operation. In accordance with this exemplary embodiment, the first mode of operation defines a first, discrete power level for the suction motor 160, while the second mode of operation defines a second, discrete power level for the suction motor 160. As used herein, a discrete power level means a specific power setting such as a low mode and a high mode.

It will be appreciated that there may be any number of different modes of operation of the suction motor 160. For example, the first mode of operation may be a low flow mode, requiring a first level on board power and the second mode of operation may be a high flow mode, requiring more on board power than the first mode of operation (a second level on board power). It will also be appreciated that each mode of operation may have one or more sub-modes. For example, the first mode of operation may include a low flow mode and a medium flow mode, where the medium flow mode operates between low flow mode and the high flow mode. The medium flow mode may operate on the first level of on board power.

To provide the different power levels for the suction motor 160, one or more power packs are provided in the surface cleaning apparatus 100. Each power pack may include one or more batteries, capacitors, or other energy storage members. For example, when a first power pack 200 is provided, the first power pack 200 provides a first level of on board power that is available to power the surface cleaning apparatus 100. When a second power pack 210 is provided, a second level of on board power is available to power the surface cleaning apparatus 100. The second level of on board power is greater than the first level of on board power. In other words, when the first power pack 200 is provided, the suction motor 160 may operate, for example, in the low or low and medium flow modes as the first mode of operation and when the second power pack 210 is provided, the suction motor 160 may operate in the high flow mode as the second mode of operation. Each of the first power pack 200 and the second power pack 210 may be removably receivable within the surface cleaning apparatus 100. Alternately, the first power pack 200 may be fixed within the surface cleaning apparatus 100, while the second power pack 210 is removably receivable within the surface cleaning apparatus 100. Accordingly, the second power pack 210 may be a supplemental battery pack that is mountable to the surface cleaning apparatus 100 or an alternate battery pack that replaces the first battery pack 200. It will be appreciated that, optionally, a series of power packs, each having a different level of on board power, may be provided and each may be removably receivable in the same recess or, each may be receivable is a different recess.

Figure 4:
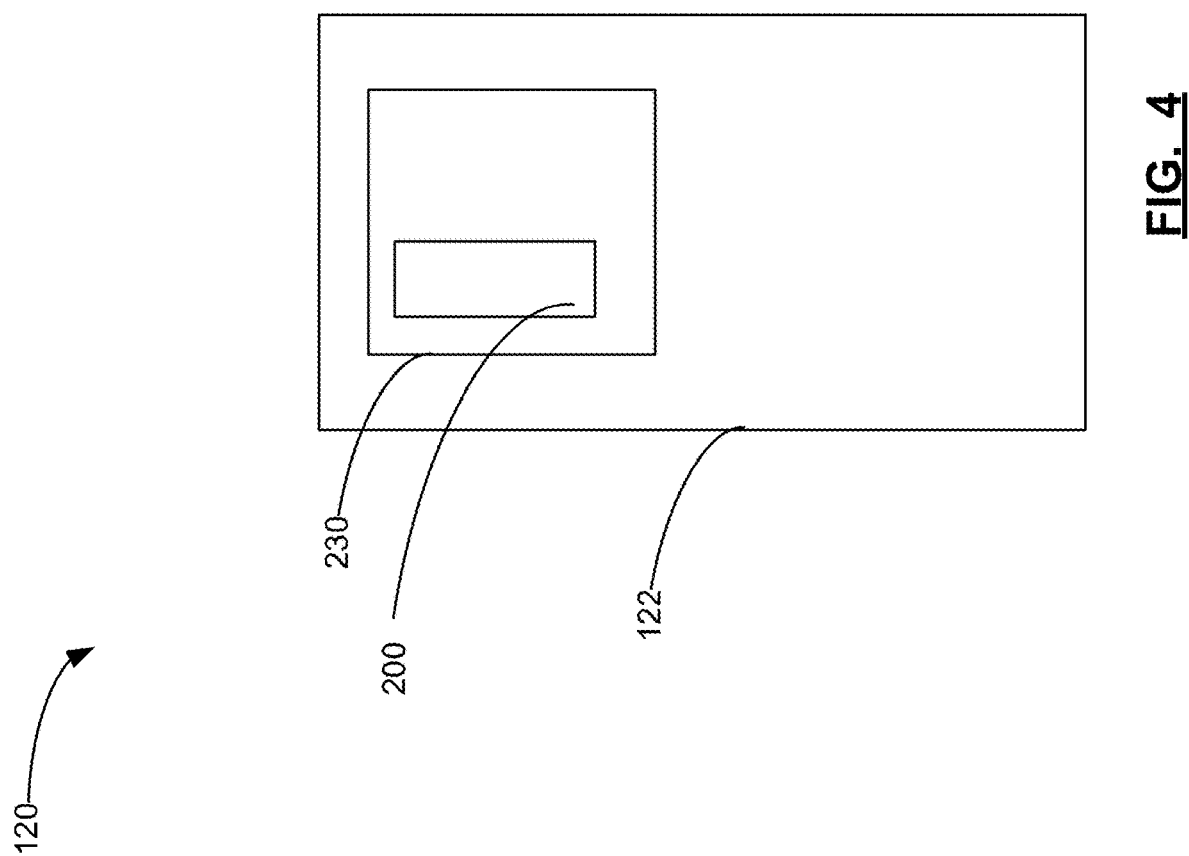
FIG. 4 is a schematic view of a hand surface cleaning apparatus with a first power pack provided.
Figure 5:
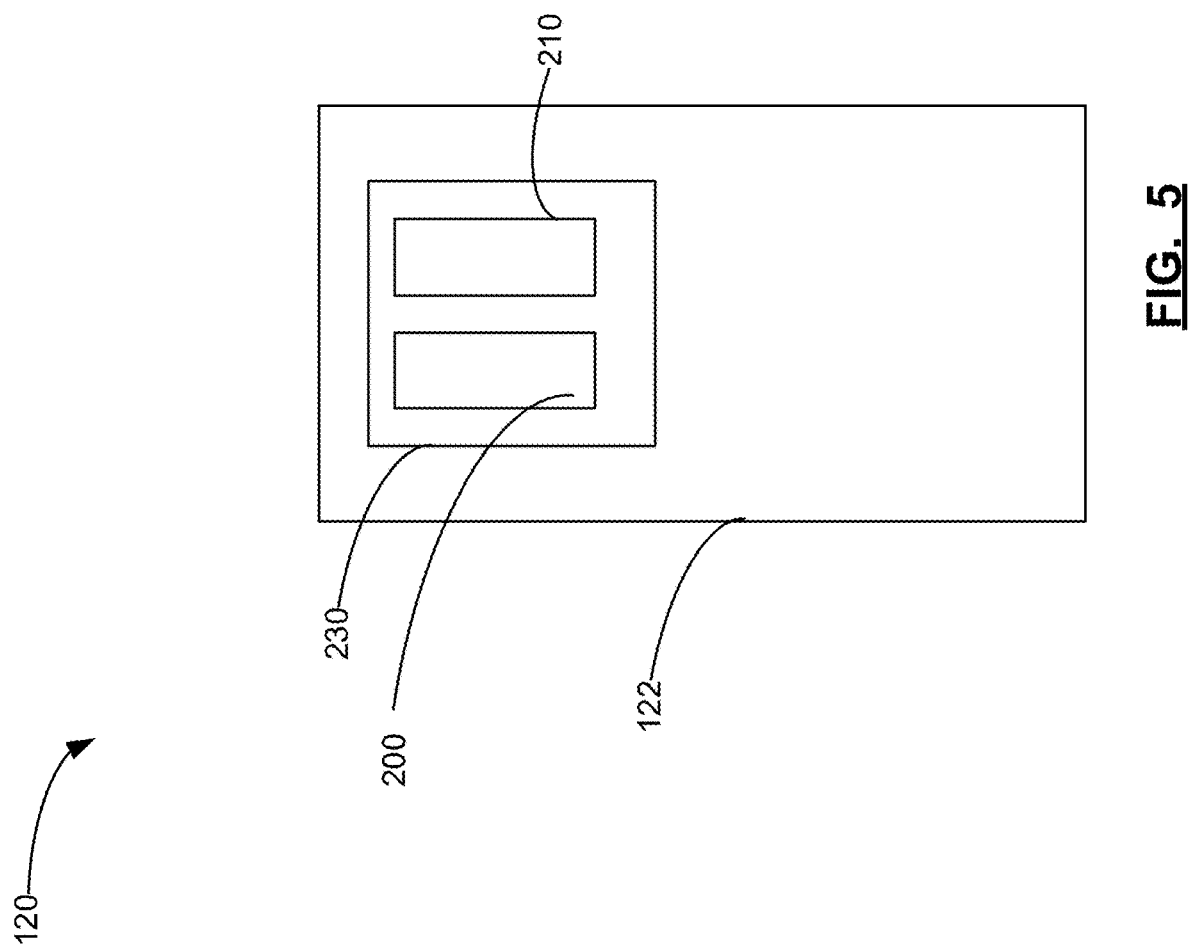
FIG. 5 is a schematic view of the hand surface cleaning apparatus of FIG. 4 with the first power pack provided and a second power pack provided.
Figure 6:
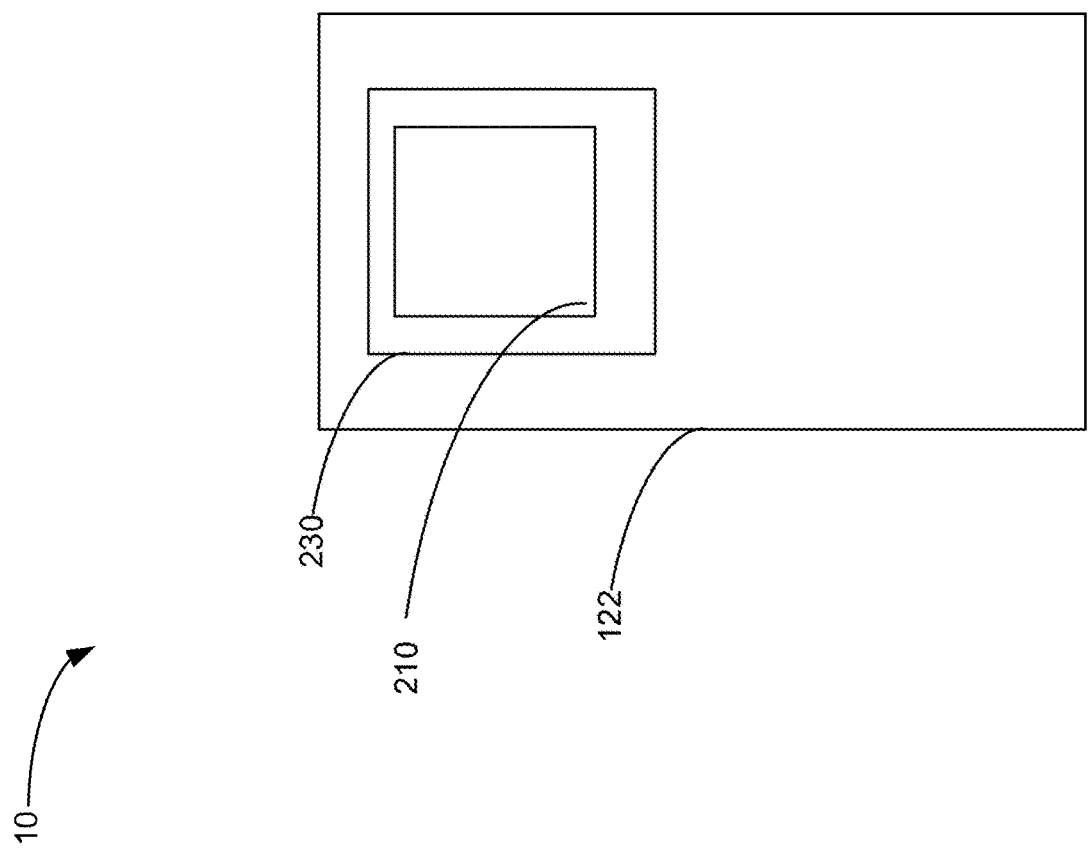
FIG. 6 is a schematic view of the hand surface cleaning apparatus of FIG. 4 with another example of a second power pack provided.

As exemplified in FIGS. 4-6, the surface cleaning apparatus 100 may have a power pack docking station 230 for receiving one, two or more power packs. It will be appreciated that the power pack docking station 230 may be any structure that removably receives a power pack. Accordingly, the power pack docking station 230 may be a recess or opening provided in a main body of a surface cleaning apparatus for removable receiving a power pack. It will be appreciated that the power pack docking station 230 may be a single recess into which the first power pack 200 and the second power pack 210 are alternately receivable. Alternately, the power pack docking station 230 may comprise a first recess into which the first power pack 200 is removably receivable and a second recess into which the second power pack is receivable, optionally while the first power pack 200 is installed or while when the first power pack 200 has been removed.

It will be appreciated that, by using alternate energy storage members, the second power pack 210 may have be able to store a greater level of on board power then the first power pack 200, but may have the same or essentially the same physical size. Accordingly, the recess into which the power packs are alternately removably receivable may be sized to physically support the power packs, e.g., the length and width of the recess in a direction transverse to an insertion direction of the power packs 200, 210 may be slightly larger than the length and width of the power packs 200, 210 in the direction transverse to the insertion direction of the power packs.

It will also be appreciated that the first power pack 200 may have the same length and width as the second power pack 210 but that the second power pack 210 may have more, e.g., batteries, than the first power pack 200 and may therefore have a larger depth in the direction of insertion then the first power pack 200. The recess may be sized to receive therein the entire depth of the second power pack 210 such that the second power pack is fully inserted into the surface cleaning apparatus 100.

FIGS. 4-6 exemplify a power pack docking station 230 that is sized to alternately receive the first power pack 200 (see FIG. 4) and a single larger second power pack 210 (see FIG. 6). As exemplified in FIG. 5, the power pack docking station 230 may also receive each of the first power pack 200 and the second power pack 210.

As exemplified in FIG. 4, power pack 200 is provided in docking station 230. If power pack 200 is removable mountable in docking station 230, then docking station 230 will have a set of electrical contacts and power pack 200 will have a mating pair of electrical contacts such that power pack 200 is electrically connected to surface cleaning apparatus 100 when power pack 200 inserted into the docking station 230. The first power pack 200 has a first level of power storage.

As exemplified in FIG. 5, the docking station 230 is sized to receive each of the first power pack 200 and the second power pack 210. Accordingly, the second power pack 210 may be utilized concurrently with the first power pack 200 to power a surface cleaning apparatus 100 and is therefore a supplementary power pack. Combined, the first and second power packs 200, 210 provide a second level of on board power storage. The second power pack 210 itself provides a third level of power storage which may be the same as, less than or more than the first level of power storage.

As with the first power pack 200, the docking station 230 may have a set of electrical contacts and power pack 210 may have a mating pair of electrical contacts such that power pack 210 is electrically connected to surface cleaning apparatus 100 when power pack 210 inserted into the docking station 230. Therefore, as exemplified in FIG. 5, docking station may be a single recess that is sized to enable both power packs 200, 210 to be inserted and engage their respective electrical contacts that are provides within the single recess. It will be appreciated that, in an alternate embodiment, the docking station 230 may comprise a two recesses, each of which is sized to receive a power pack 200, 210.

As exemplified in FIG. 6, the second power pack 210, has a larger power capacity than the first power pack 200 and is physically larger than the first power pack 200. The docking station 230 is sized to receive the second power pack 210 but, due to the size of the second power pack 210, the first power pack 200 may not be concurrently mounted in the docking station 230. Accordingly, the first power pack 200 may be removed from the surface cleaning apparatus 100 and may be replaced with the second, larger power pack 210. The second power pack 210 may then provide the second, greater level of on board power to the surface cleaning apparatus 100. It will be appreciated that, in such an embodiment, the second power pack 210 may engage any of the sets of electrical contacts provided in the docking station or, alternately, a third set of electrical contacts may be provided in the docking station 230 for the second power pack 210 to engage.

It will be appreciated that there may be any number of power packs removably receivable in the surface cleaning apparatus 100. The capacity of each power pack may vary or may be the same. Accordingly, a user (or a manufacturer) may choose the level of desired on board power and select the appropriate power pack and/or power packs to achieve the desired level of on board power.

In accordance with this aspect, the selected level of on board power is used to enable or disable the modes of operation of the suction motor 160. For example, the first mode of operation is enabled when the first power pack 200 is provided to power the surface cleaning apparatus 100. However, the second mode of operation is not enabled until the second power pack 210 is provided to power the surface cleaning apparatus 100. In other words, the second power pack 210 is used to enable the second mode of operation of the suction motor 160. As described above, the second power pack 210 may be a larger power pack than the first power pack 200 and may replace the first power pack 200, as exemplified in FIG. 6, or the second power pack 210 may be a supplemental power pack that operates with the first power pack 200 to provide the second level of on board power, as exemplified in FIG. 5.

Figure 7:
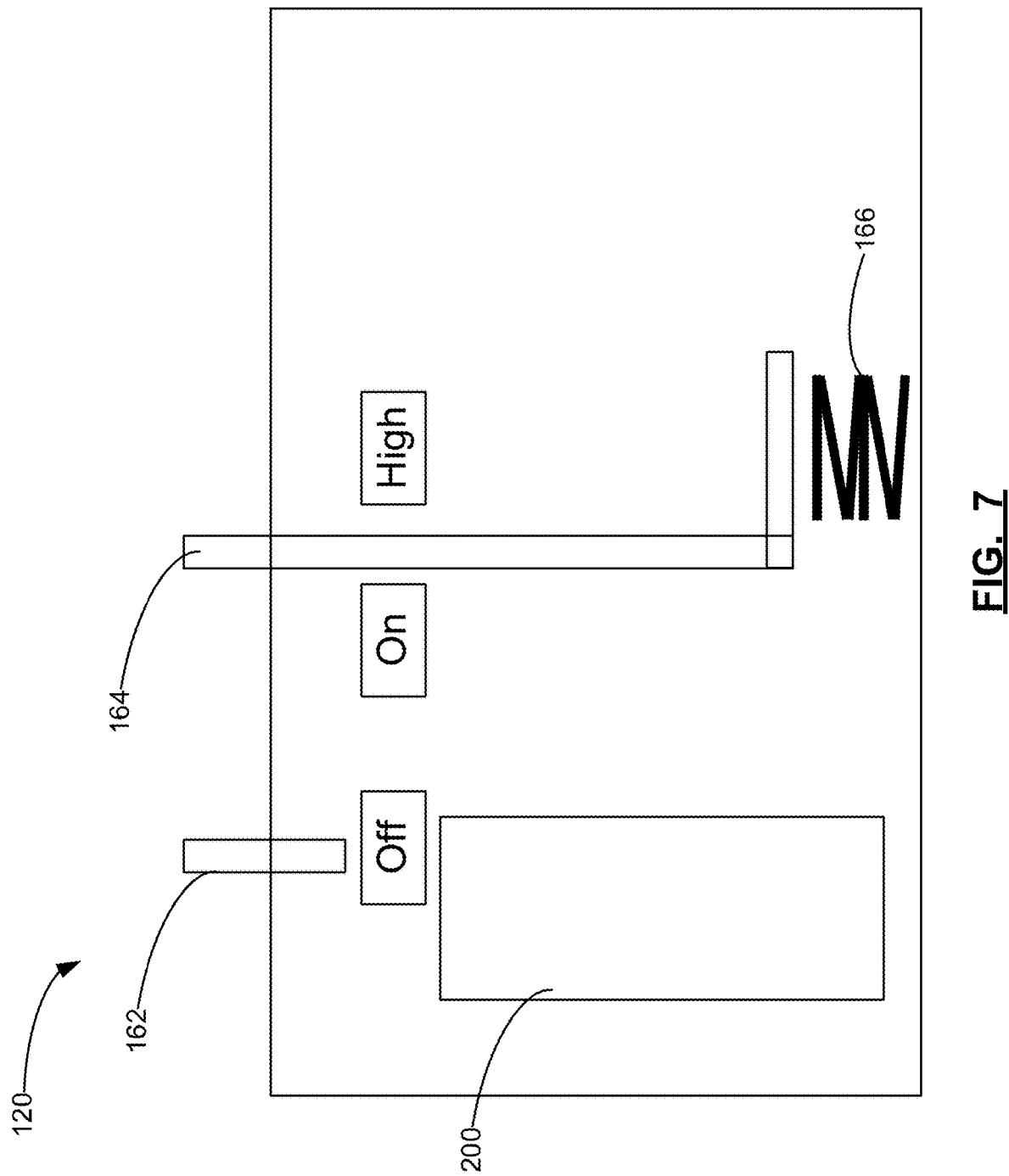
FIG. 7 is a schematic view of a mechanical switch actuator used in a surface cleaning apparatus, the mechanical switch in an off position.
Figure 8:
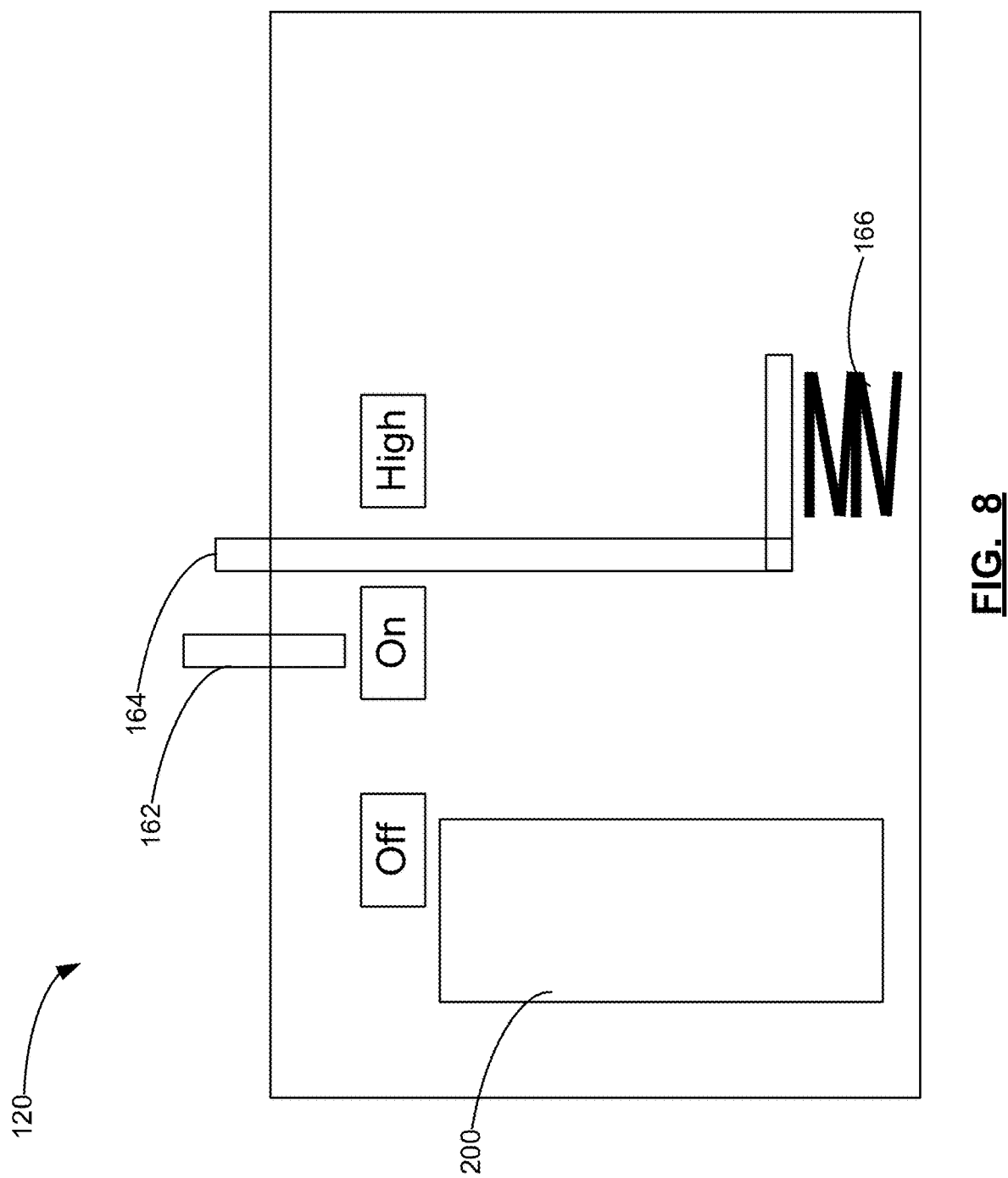
FIG. 8 is a schematic view of the mechanical switch actuator of FIG. 7 in an on position.
Figure 9:
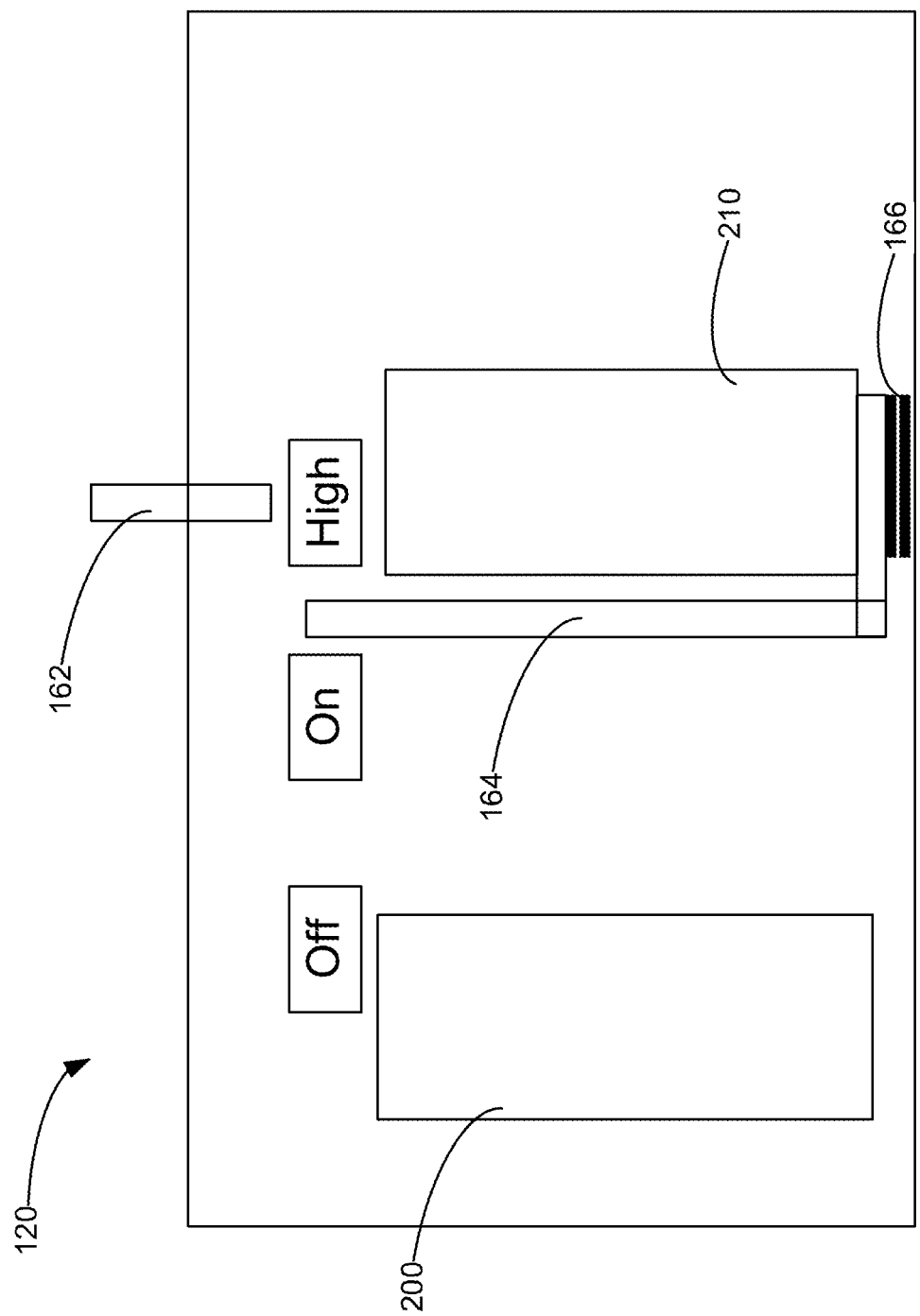
FIG. 9 is a schematic view of the mechanical switch actuator of FIG. 7 in a second on position that is a high on position.
Figure 10:
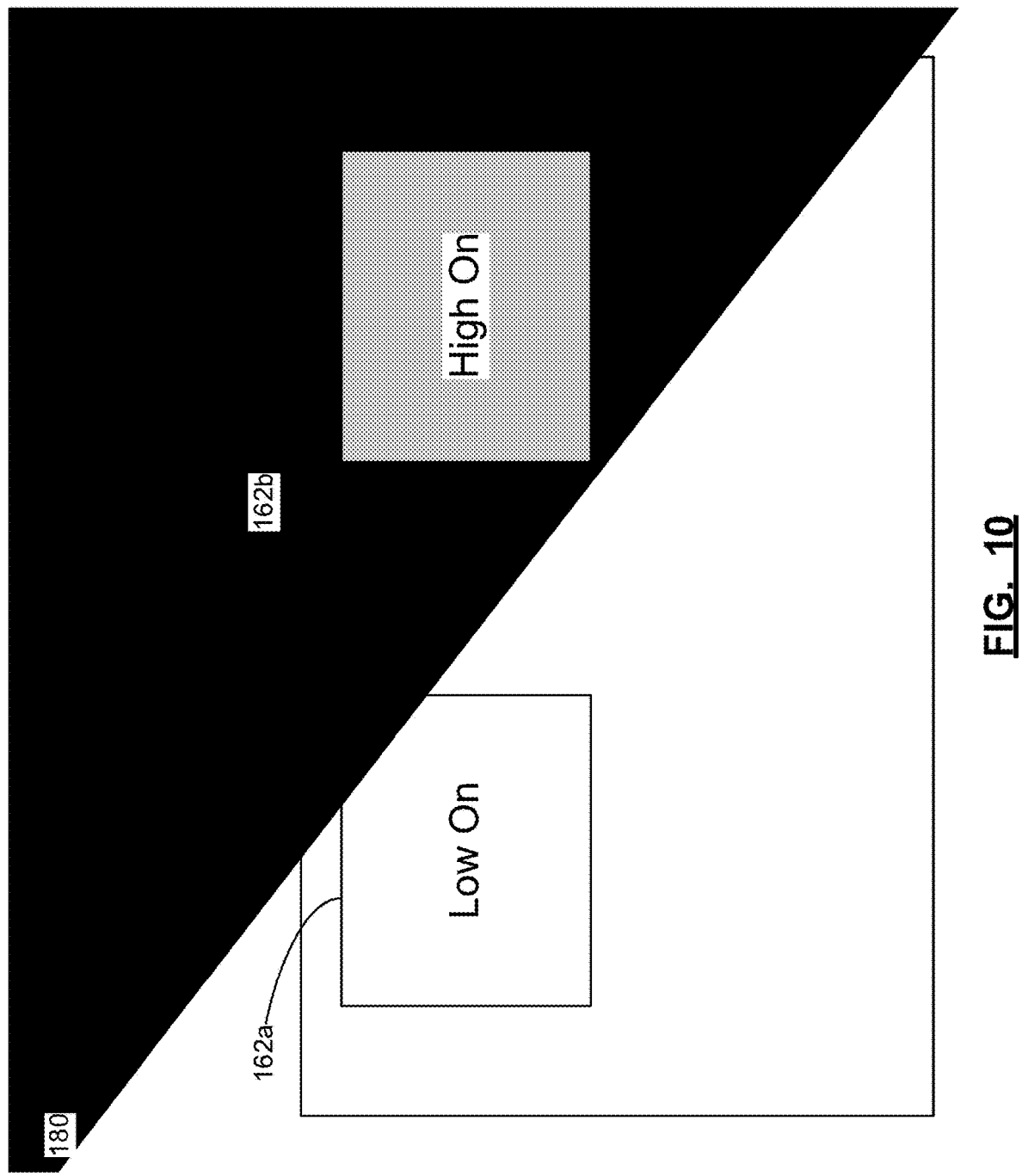
FIG. 10 is a schematic view of an exemplary digital user interface with a suction motor actuator having a first actuation portion and a second actuation portion, with the first actuation portion activated.
Figure 11:
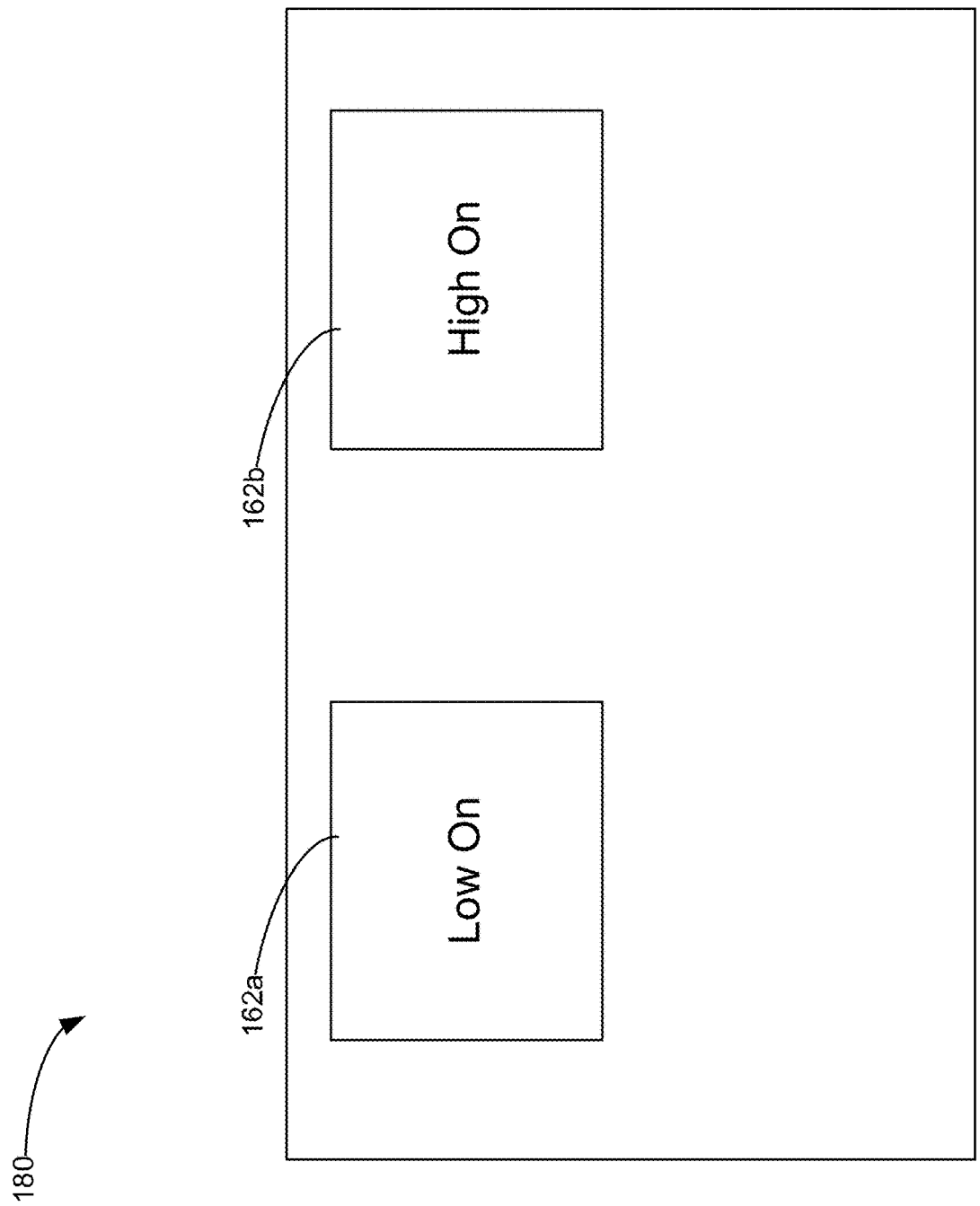
FIG. 11 is a schematic view of the digital user interface of FIG. 10 with the second actuation portion activated.

As exemplified in FIGS. 7-9, the suction motor actuator 162 may be a mechanical switch 162 that is movable a between an off position, a first on position, and a second on position. When the switch 162 is in the first on position, a first level of power is provided to the suction motor 160 and when the switch 162 is in the second on position, a second level of power is provided to the suction motor 160, the second level of power being greater than the first level of power. As exemplified, the second on position is a high power mode of operation, which is enabled by the provision of the second power pack 210.

In some embodiments, the suction motor actuator 162 may only be moveable to the second on position once the second power pack 210 is provided to power the surface cleaning apparatus. For example, as exemplified in FIGS. 7-9, the suction motor actuator 162 is a slide switch that is slidable between the off (see FIG. 7), first on (see FIG. 8), and second on (see FIG. 9) positions. A lock 164 extends through the path of the slide switch 162, preventing the switch 162 from sliding to the second on position (e.g., the high flow position) until the second power pack 210 is provided. As exemplified in FIG. 9, the provision of the second power pack 210 unlocks the suction motor actuator 162 such that the suction motor actuator 162 is movable to the second on position. The lock 164 is unlocked by the second power pack 210 engaging with, and moving, the lock 164 out of the slide path of the switch 162, thereby enabling the switch 162 to move to the second on position. As shown, a biasing member 166 provides an upward bias on the lock 164, such that when the second pack 210 is removed, the lock 164 moves back to the locked position. It will be appreciated that the lock 164 may be any device capable of inhibiting the motion of the switch 162, such that the switch 162 cannot enter the second on mode.

While the examples show the inclusion of a supplementary power pack 210 to unlock the lock 164, it will be appreciated that the lock 164 may be designed to be unlocked with the inclusion of a larger capacity second power pack 210 that replaces the first power pack 200. For example, the larger capacity second power pack 210 may have an increased footprint within the surface cleaning apparatus 100 such that the second power pack 210 moveably engages with the lock 164, while the smaller first power pack 200 does not.

In an alternate embodiment, the lock may be disengaged upon the second power pack 210 engaging a set of electrical contacts positioned to engage the second power pack 210 when the second power pack 210 is inserted into the docking station 230 as discussed previously.

In some embodiments, the surface cleaning apparatus 100 may include a digital user interface 180, as exemplified in FIGS. 10-18. The digital user interface 180 may include the suction motor actuator 162. As exemplified, the suction motor actuator 162 is a touch button provided on the digital user interface 180. As described previously, the suction motor actuator 162 may be used to actuate the first and second modes of operation. For example, in some embodiments, when the suction motor actuator 162 is pressed a first time, and only the first power pack 200 is provided to power the surface cleaning apparatus, the first mode of operation is actuated. When the suction motor actuator 162 is pressed a second time, the surface cleaning apparatus may turn off. Similarly, when the suction motor actuator 162 is pressed a first time, and either the first power pack 200 and a supplemental second power pack 210 is provided or a single higher capacity second power pack 210 is provided to power the surface cleaning apparatus, the first mode of operation is actuated. When the suction motor actuator 162 is pressed a second time, the second mode of operation is actuated. When the suction motor actuator 162 is pressed a third time, the surface cleaning apparatus may turn off. Accordingly, as described previously, the second mode of operation may only be actuated when the second power pack 210 is provided.

As exemplified in FIGS. 10-11 and 16-18, the suction motor actuator 162 may include a first actuation portion 162a and a second actuation portion 162b of the user interface 180. The first mode of operation may be actuated when the first actuation portion 162a is operated by a user and the second mode of operation may be actuated when the second actuation portion 162b is operated by the user. As exemplified in FIGS. 10-11 and 16-18, the first actuation portion 162a actuates a low flow mode and the second actuation portion 162b actuates a high flow mode.

As exemplified in FIGS. 10-18, the digital user interface 180 may change when the second power pack 210 is electrically connected to the surface cleaning apparatus 100. As shown, the greyed-out regions indicate that the actuation portion is disabled while the white regions indicate that the actuation portion is enabled. For example, when only the first power pack 200 is provided, the digital user interface 180 may display an illuminated touch area as the first actuation portion 162a for actuating the first mode (i.e., on or off), as exemplified in FIG. 10. When the second power pack 210 is provided, the digital user interface may display the second actuation portion 162b as a new illuminated area for actuating the second mode, as exemplified in FIG. 11.

It will be appreciated that the labelling of the actuation portions 162a, 162b may be varied when the second power pack 210 is provided. Accordingly, for example in the embodiment of FIG. 10, when the first power pack 200 is provided, the first actuation portion 162a may display "on" and the second actuation portion 162b may not be illuminated and may therefore not be visible to a user. When the second power pack 210 is provided, the display of the first actuation portion 162a may change from "on" to "low" and the second actuation portion 162b may display "high". Accordingly, the controls of the digital user interface 180 may vary depending on the power levels available to the surface cleaning apparatus 100 provided by the first power pack 200 and/or the second power pack 210.

In some embodiments, the surface cleaning apparatus 100 may include a controller that enables the second mode of operation when the second power pack 210 is provided to power the surface cleaning apparatus. For example, the surface cleaning apparatus may have a sensor that detects when the second power pack 210 is provided in the surface cleaning apparatus. This sensor may be a part of, for example, the lock 164. The sensor may communicate with the controller to indicate the provision of the second power pack 210.

Brush Motor Actuator

In accordance with this aspect, which may be used by itself or in combination with one or more other aspects, the surface cleaning apparatus 100 has a surface cleaning head 140 with a brush motor 144 drivingly connected to a moveable brush member 146. The brush motor 144 is operable in one or more additional operational modes when additional on board power is provided. Accordingly, for example, a user may be able to upgrade their, e.g., stick vacuum cleaner, to have a brush on mode of a carpet or high brush on mode by inserting a supplemental battery pack or replacing the original battery pack with a higher powered battery pack.

Accordingly, the surface cleaning apparatus 100 may have a brush motor actuator 150 that is operable to actuate a first mode of operation of the brush motor 144. The brush motor actuator 150 is not enabled to actuate the first mode of operation until the surface cleaning apparatus 100 is provided with a sufficient level of on board power. An advantage of this design is that the provision of the second power pack 210 may be used to enable the operation of the brush motor 144.

It will be appreciated that the first mode of operation may be a carpet or high power brush on mode (a high speed of movement of the moveable brush member 146). In accordance with such an embodiment, the original power pack 200 that is provided with the surface cleaning apparatus may have sufficient power storage capacity to enable the brush roll to operate on a low or bare floor cleaning mode (low speed of movement of the moveable brush member 146) but not sufficient power storage capacity to enable the brush roll to operate to clean carpet while the suction motor is operational for a preset run time. However, when a supplemental power pack is provided or the original power pack is replaced by a second power pack 210, the surface cleaning apparatus may have sufficient on board power to enable the brush motor to operate on a carpet cleaning mode while the suction motor is operational for a preset run time.

It will be appreciated that the first mode of operation may also be a brush on mode. In accordance with such an embodiment, the original power pack 200 that is provided with the surface cleaning apparatus may not have sufficient power storage capacity to enable the brush roll to operate while the suction motor is operational for a preset run time. However, when a supplemental power pack is provided or the original power pack is replaced by a second power pack 210, the surface cleaning apparatus may have sufficient on board power to enable the brush motor to operate while the suction motor is operational for a preset run time. In such a case, the brush may have a single on position, or two or more on positions (e.g., low speed and high speed)

As exemplified in FIG. 2-3C, the surface cleaning head 140 may have a brush motor 144 that is drivingly connected to a moveable brush 146. In operation, the brush motor 144 drives the moveable brush 146 to assist with the entrainment of dirt and/or other debris from the surface to be cleaned through the dirty air inlet 142 in the surface cleaning head 140. The moveable brush 146 may be any brush capable of facilitating the entrainment of dirt into the surface cleaning head 140, including, but not limited to, a rotatable brush, a flat brush, and an oscillating brush.

The surface cleaning apparatus 100 may also have a brush motor actuator 150 that is operable to actuate the first mode of operation of the brush motor 144. Accordingly, when a supplemental power pack 210 or the original power pack 200 is replaced by a second power pack 210, the brush motor actuator 150 is operable to enable the first mode of operation. Accordingly, if the first mode of operation is a brush on mode, then the brush motor actuator 150 may not be enabled to actuate the brush motor 144 until the second power pack 210 is provided to power the surface cleaning apparatus 100. In other words, when the surface cleaning apparatus 100 is provided with the additional level of on board power resulting from the provision of the second power pack 210, the brush motor 144 may be actuated by the brush motor actuator 150.

Similarly, if the first mode of operation is a carpet or high power brush on mode, then the brush motor actuator 150 is operable to actuate the brush motor 144 in, e.g., a low power mode (which could be referred to as a second mode of operation). However, until additional on board power is provided, the brush motor actuator 150 is not operable to actuate the first mode of operation of the brush motor 144.

In some embodiments, the brush motor actuator 150 may be a mechanical switch moveable between an off position and the on position. In the on position, a first level of power may be provided to the brush motor 144 such that brush motor actuator 150 is moveable to the on position once the second power pack 210 is provided to power the surface cleaning apparatus 100. As described previously with regards to the suction motor actuator 162, the provision of the second power pack 210 may unlock the brush motor actuator 150 such that the brush motor actuator 150 is movable to first mode on position.

It will be appreciated that, in the first mode of operation, the brush motor 150 may have more than one power level (e.g., speeds of rotation). Accordingly, the first mode may comprise a low speed of movement of the moveable brush member 146, and a high speed of movement of the moveable brush member 146. In such an embodiment, the brush motor actuator 150 may be inoperable to actuate the brush motor 144 when the first (original) power pack 200 is provided to power the surface cleaning apparatus 100 and operable to actuate the first mode of operation when a supplemental power pack or the second power pack 210 is provided to power the surface cleaning apparatus. Accordingly, the mechanical switch 150 may be moveable between an off position, a low speed mode of operation on position and a high speed mode of operation on position wherein the low speed mode of operation on position and the high speed mode of operation on position are unlocked a higher level of on board power is provided.

Alternately, the brush motor actuator 150 may be operable the second mode of operation when the first power pack is provided and operable in the first mode of operation when a second higher level of on board power is provided (e.g., by the provision of the supplemental power pack of the first power pack being replaced by the second power pack). In such an embodiment, the brush motor actuator 150 may be a mechanical switch 150 that may be moveable between an off position, a low speed (second mode of operation) on position and a high speed (first mode of operation) on position. In the first mode of operation, a first level of power may be provided to the brush motor 144 and in the second mode of operation a second level of power may be provided to the brush motor 144, the first level of power being greater than the second level of power. The brush motor actuator 150 is moveable to the low speed on position when the first power pack 200 is provided and is not moveable to the high speed on position until the higher level of on board power is provided.

It will be appreciated that, while FIGS. 7-9 show the operation of the mechanical switch 162 that is the suction motor actuator 162, the same design may be used for the brush motor actuator 150. As described previously, the provision of the second power pack 210 may unlock the brush motor actuator 150 whereby the brush motor 150 is moveable to the first mode of operation on position. In other words, the brush motor 150 may be operable in the second, lower level of power mode of operation with the provision of the first power pack 200 but is only operable in the first, higher level of power mode of operation with the provision of the second power pack 210.

As described previously, the surface cleaning apparatus 100 may include the digital user interface 180. In some embodiments, the digital user interface 180 may include the brush motor actuator 150, as exemplified in FIGS. 12-17. For example, the brush motor actuator 150 may be an illuminated touch area on the digital user interface 180. Touching the area that is the brush motor actuator 150 may actuate the first mode of operation once the second power pack 210 is provided to power the surface cleaning apparatus 100.

Figure 12:
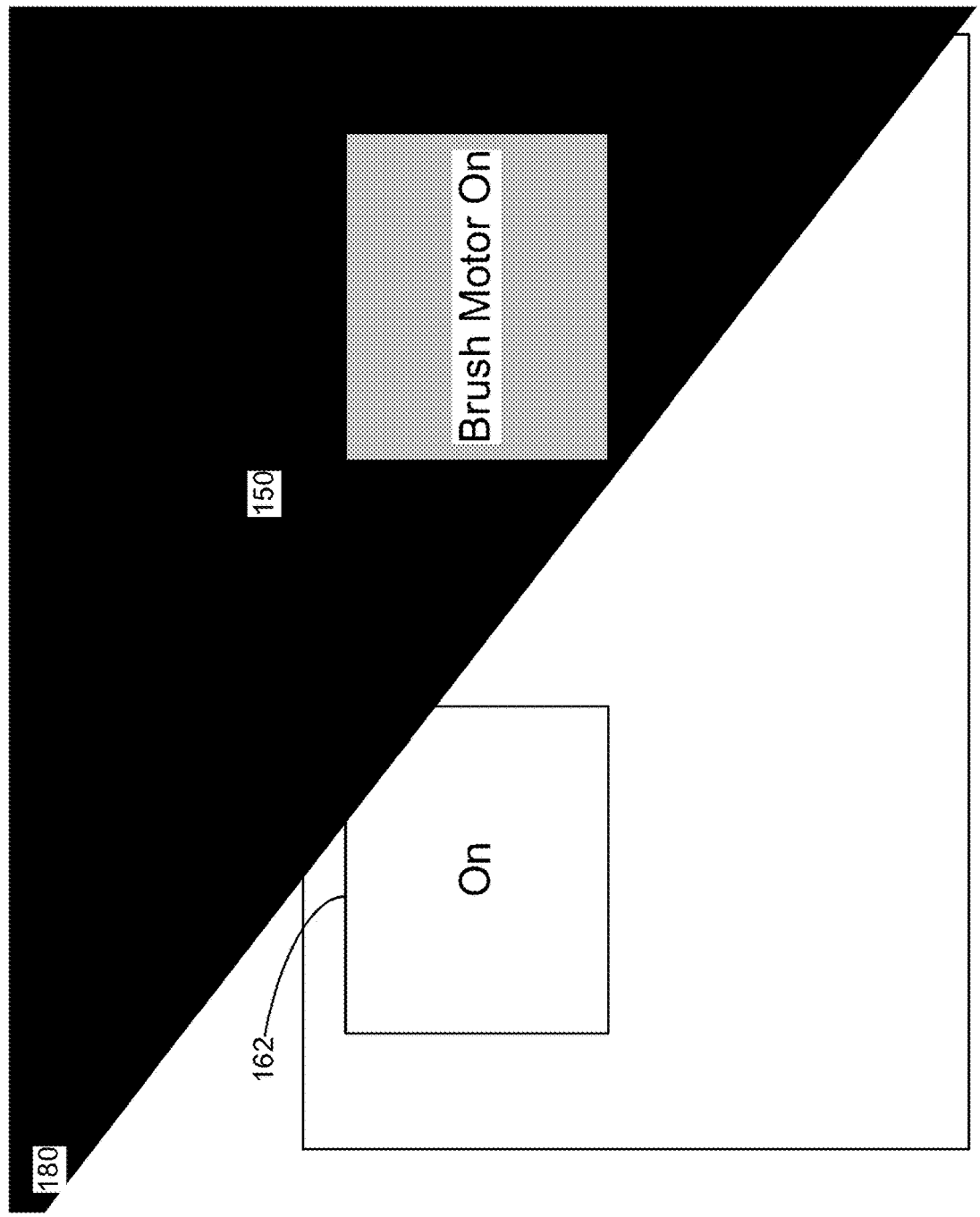
FIG. 12 is a schematic view of another exemplary digital user interface with a brush motor actuator that is disabled.
Figure 13:
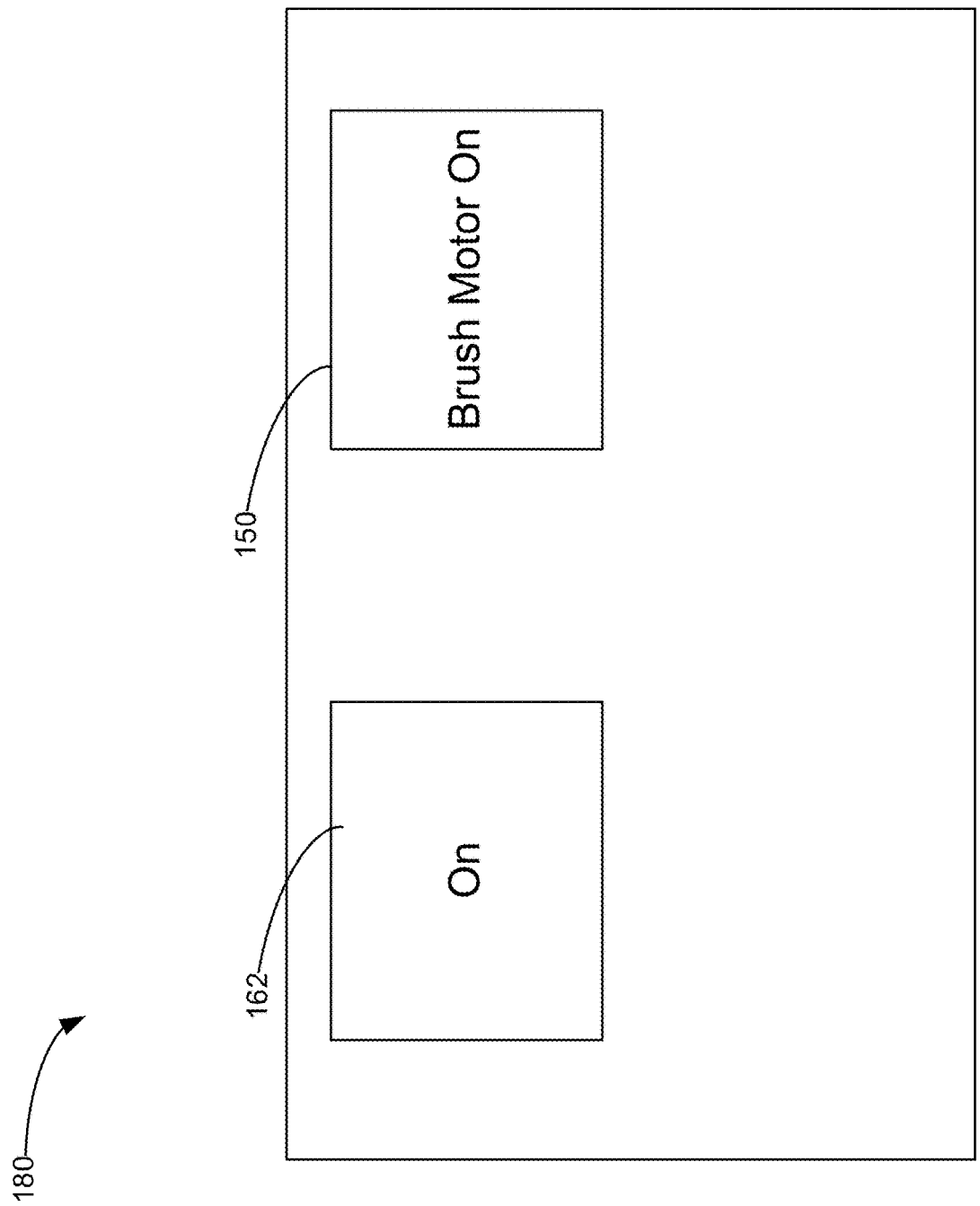
FIG. 13 is a schematic view of the digital user interface of FIG. 12 with the brush motor actuator enabled.

As exemplified in FIGS. 12 and 13, the brush motor actuator may be operable to a single on position. Accordingly, when the first power pack 200 is provided, the touch area representing the brush motor actuator 150 may not be illuminated and may not be visible (se FIG. 12). When the second level of power is provided, the brush motor actuator 150 may be enabled and accordingly the touch area representing the brush motor actuator 150 may be illuminated (see FIG. 13).

If the digital brush motor actuator 150 may be a single touch area that is operable to actuate the first and second modes of operation and the second mode of operation may be operable when the first power pack 200 is provided. Accordingly, for example, the brush motor actuator 150 may be pressed a first time, with either the first power pack 200 or the second power pack 210 provided, thereby enabling the second mode of operation. When the brush motor actuator 150 is pressed a second time and the second power pack 210 is provided, the first mode of operation is enabled. In other words, the second, lower level of operation may be enabled by the provision of either the first power pack 200 or the second power pack 210, or both, while the first, higher mode of operation may only be enabled once the higher on board power level is provided.

Figure 14:
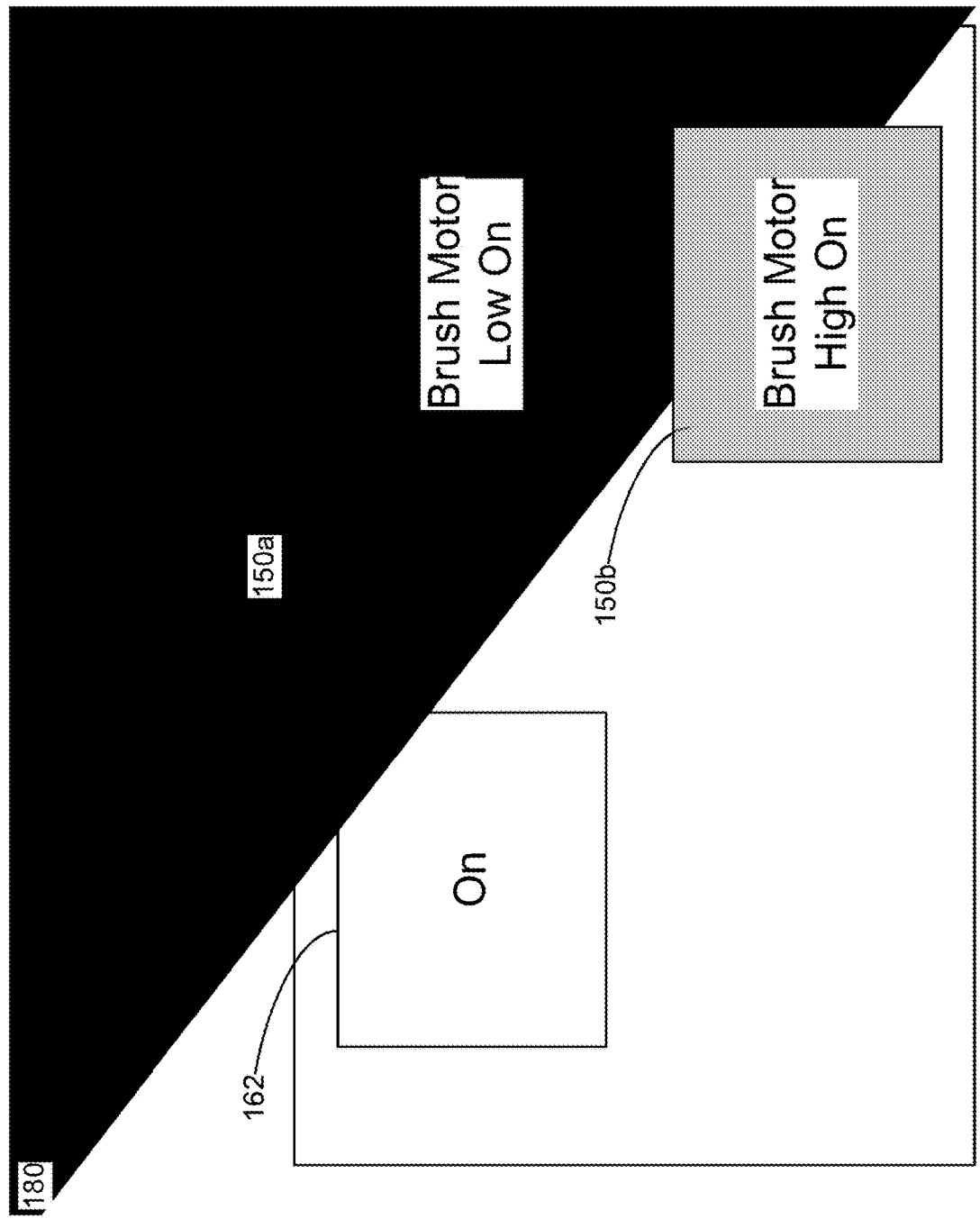
FIG. 14 is a schematic view of another exemplary digital user interface with a brush motor actuator having first actuation portion and a second actuation portion, with the first actuation portion enabled.
Figure 15:
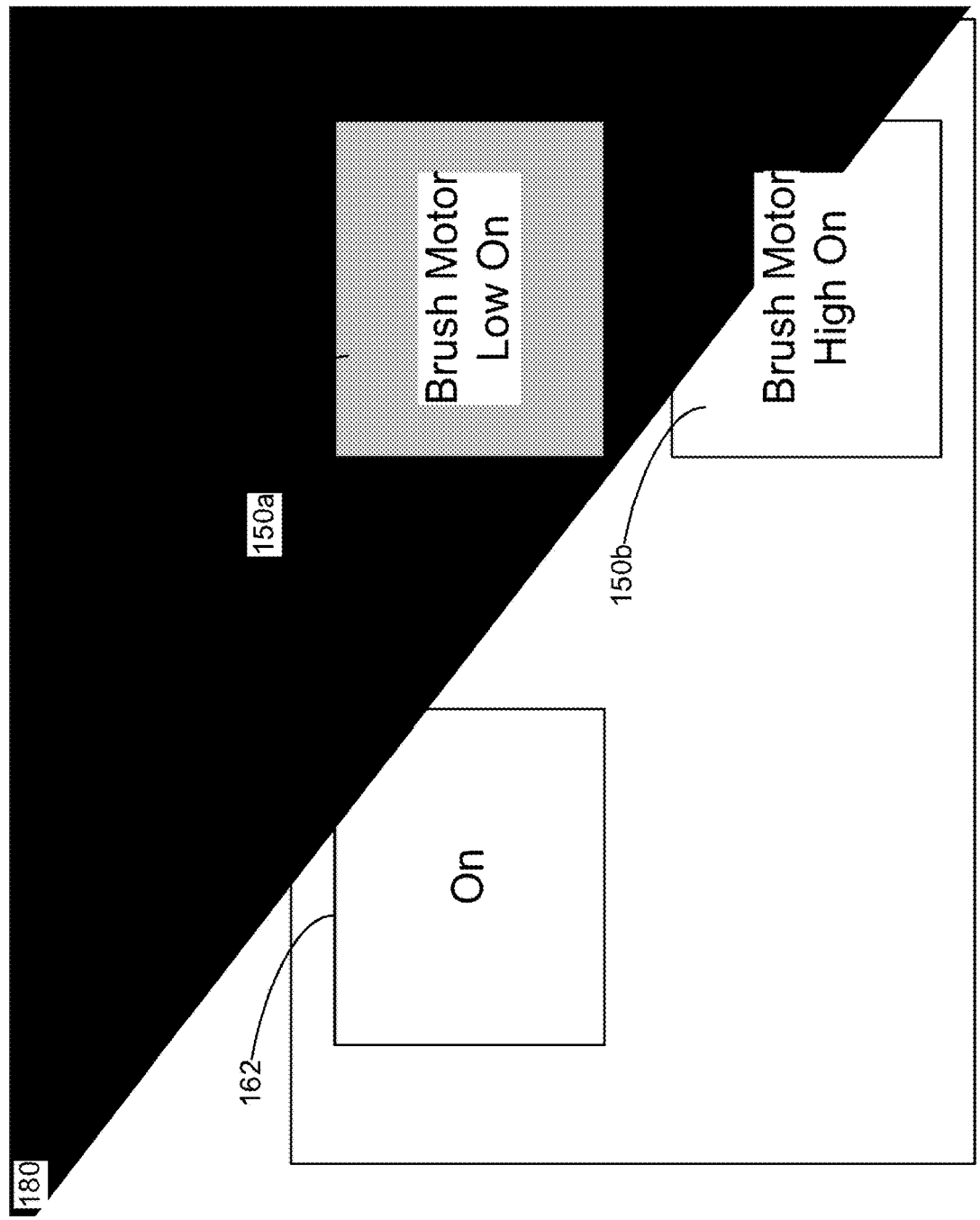
FIG. 15 is a schematic view of the digital user interface of FIG. 14 with the second actuation portion enabled.
Figure 16:
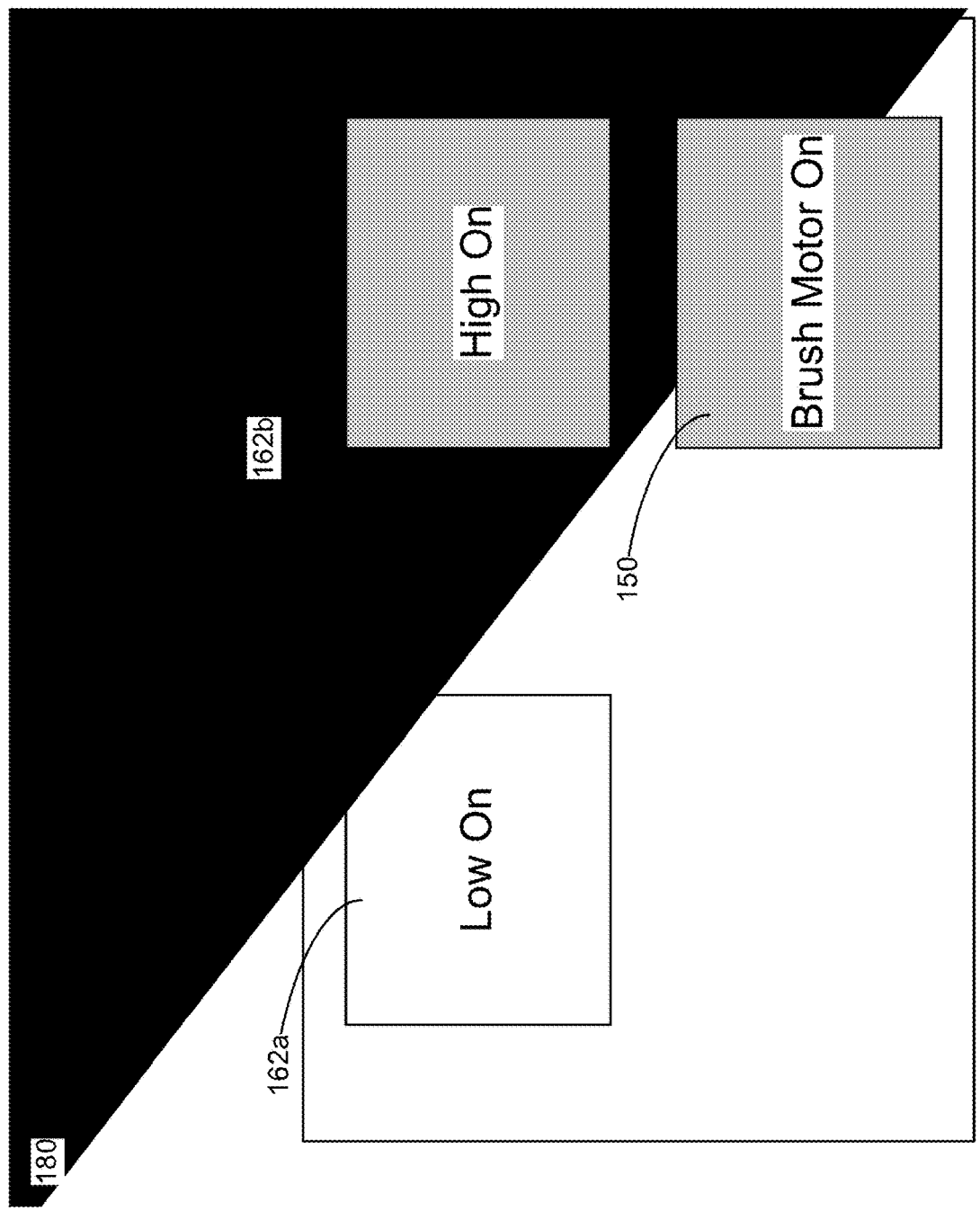
FIG. 16 is a schematic view of another exemplary digital user interface with a suction motor actuator and a brush motor actuator, the suction motor actuator having a first actuation portion and a second actuation portion with the first actuation portion enabled.
Figure 17:
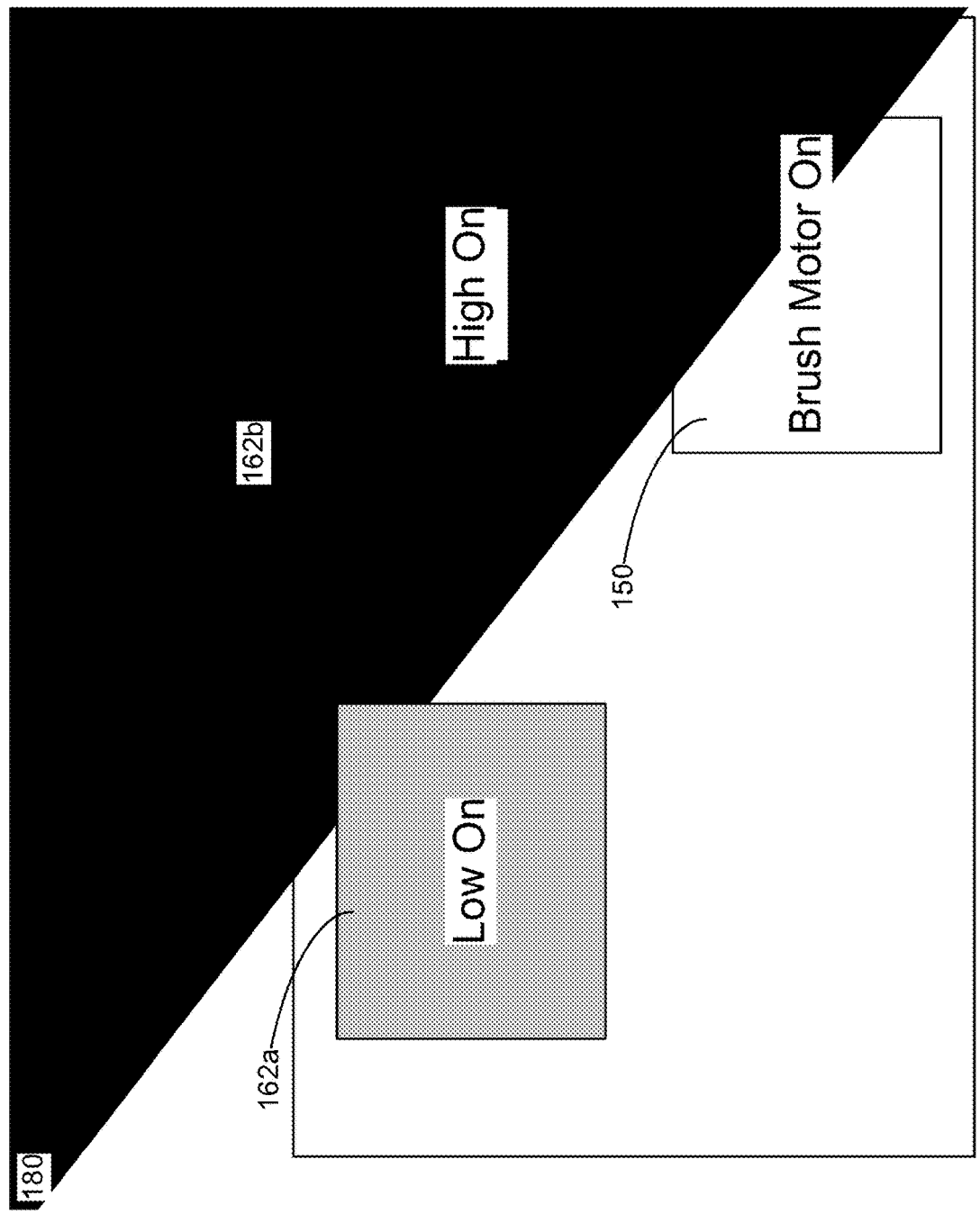
FIG. 17 is a schematic view of the digital user interface of FIG. 16 with the second actuation portion enabled and the brush motor actuator enabled; and, FIG. 18 is a schematic view of another exemplary digital user interface with a suction motor actuator and a power level adjustment controller.
Figure 18:
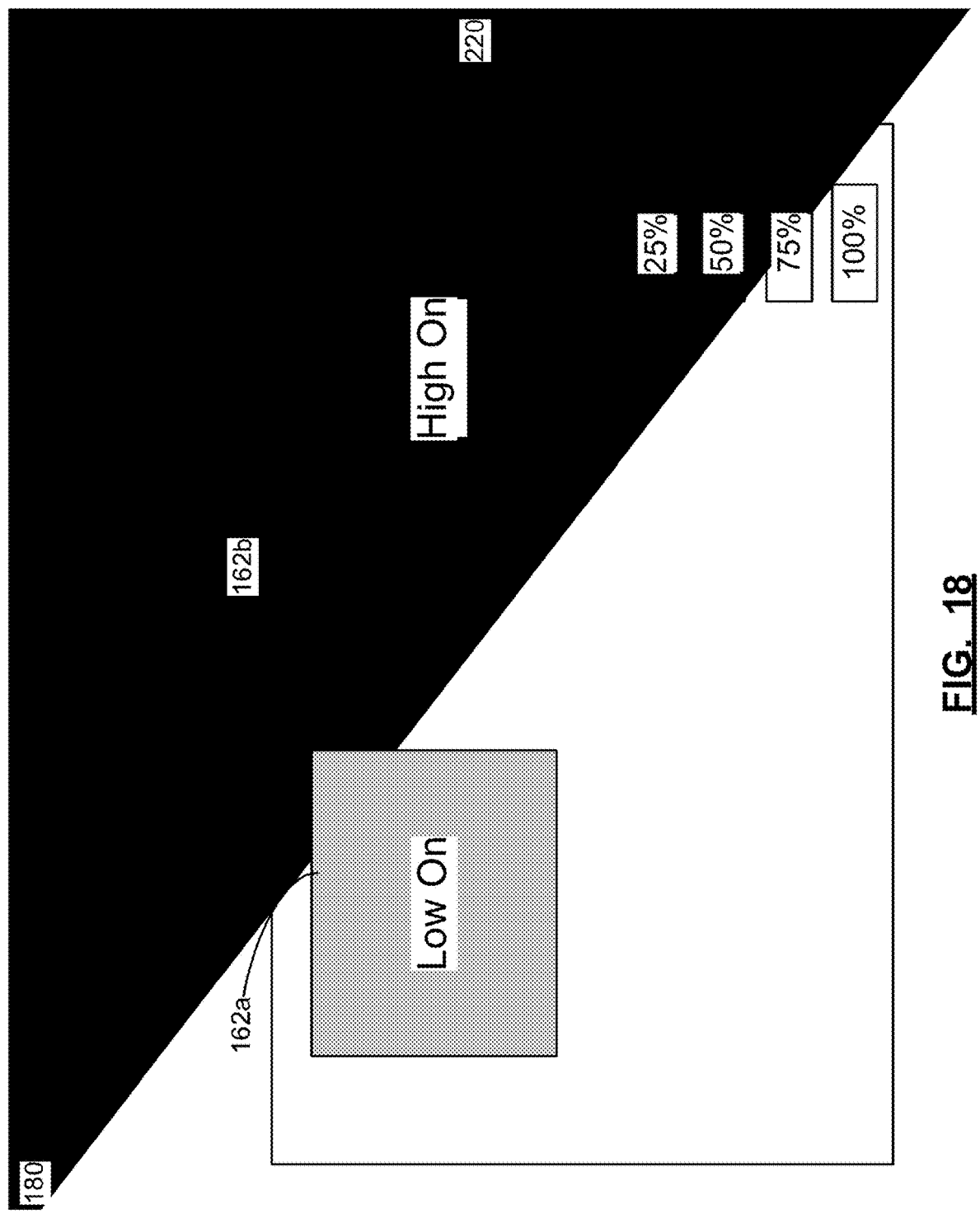

Alternately, as exemplified in FIGS. 14-15, the brush motor actuator 150 may include a first actuation portion 150a of the user interface corresponding to the second mode of operation and a second actuation portion 150b of the user interface corresponding to the first mode of operation. To indicate which mode of operation is enabled, the corresponding actuation portion may be illuminated. For example, when either the first power pack 200 or the second power pack 210 is provided, the first actuation portion 150a is illuminated, while the second actuation portion 150a is not illuminated until the second power pack 210 is provided to power the surface cleaning apparatus 100.

In some embodiments, the surface cleaning apparatus 100 may include a controller that enables the first mode of operation of the brush motor 144 when the second power pack 210 is provided to power the surface cleaning apparatus 100.

Operating Power Levels

In accordance with this aspect, which may be used by itself or in combination with one or more other aspects, the provision of a higher level of on board power to the surface cleaning apparatus 100 enables the operating power level of the suction motor 160 and/or the brush motor 144 to be increased. An advantage of this aspect is that the surface cleaning apparatus 100 can operate at a first operating power level when the first power pack 200 is provided and can operate at a second, increased operating power level when the second power pack 210 (a supplemental power pack is provided or the first power pack is replaced by a second power pack having a higher power storage capacity) is provided. As described previously, when the first power pack 200 is provided, the first power pack 200 provides a first level of on board power and when the second power pack 210 is provided, a second level of on board power is provided to power the surface cleaning apparatus 100, with the second level of on board power being greater than the first level. Accordingly, a user can increase the operating power of the surface cleaning apparatus 100 with the provision of the second power pack 210 to improve the cleaning ability of the surface cleaning apparatus 100.

For example, the operating power level of one or more modes of operation of the suction motor may be increased when the on board power level is increased. In accordance with such an embodiment, the suction motor actuator 162 may be actuatable to actuate the suction motor to operate in a first, low mode of operation and to operate in a second, high mode of operation. Providing the second power pack 210 enables an increased power mode of operation of one or both of the low and high modes of operation. In other words, each of the low and high modes of operation may be enabled at a first operating power level when the first power pack 200 is provided and/or when the second power pack 210 is provided. When the second power pack 210 is provided to power the surface cleaning apparatus 100, one or both of the first and second modes may operate at a second, higher operating power level.

For example, the provision of the second power pack 210 may increase the operating power level of the low mode, so the suction motor 160 can operate at an increased low mode while the operating power level of the high mode remains the same. Similarly, the provision of second power pack 210 may increase the operating power level of the high mode, so the suction motor 160 can operate at an increased high mode while the operating power level of the low mode remains the same. Alternately, when the second power pack 210 is provided, the operating power of each of the low and high modes of operation may be increased.

When operating in the low mode of operation, the suction motor 160 produces a low rate of flow and when operating in the high mode of operation, the suction motor 160 produces a high rate of flow. In some embodiments, the provision of the second power pack 210 may automatically increase the low rate of flow and/or the high rate of flow. In other words, the base operating flow rates of each of the low and high rates of flow may be increased once the second power pack 210 is provided, thereby increasing the overall suction power of the surface cleaning apparatus 100. In some embodiments, once the second power pack 210 is provided, the user may select which rate of flow they would like to increase.

It will be appreciated that the suction motor may have a single on operating position and the operating power level of the suction motor may be automatically increased when the second power pack 210 is provided.

Alternately, or in addition, if the surface cleaning apparatus has a brush motor 144, then the operating power level of one or more of the operational levels of the brush motor 144 may be increased and optionally, automatically increased, then the second power pack 210 is provided.

For example, the brush motor 144 may be operable at a low speed mode of operation and a high speed mode of operation. If the low speed mode of operation and the high speed mode of operation are enabled when the first power pack 200 and/or the second power pack 210 is provided to power the surface cleaning apparatus 100 then, when the second power pack 210 is provided, the operating power level provided to the brush motor 144 in the low speed mode of operation and/or the high speed of mode of operation may be increased. Optionally, each of the low speed mode and the high speed mode may be increased by the provision of the second power pack 210. Alternately, the provision of the second power pack 210 may increase the operating power level of one of the low speed mode or the high speed mode.

It will be appreciated that the increased operating power level provided to the brush motor 144 may be automatically increased by the provision of the second power pack 210 or may be selectively increased by the user. Similarly, a speed of movement of the moveable brush member 146 in the low speed mode and/or the high speed mode may be increased by the provision of the second power pack 210.

In some embodiments, the surface cleaning apparatus 100 may have a controller that enables the increased operating power level provided to the suction motor 160 and/or brush motor 144 when the second power pack 210 is provided.

Power Level Adjustment

In accordance with this aspect, which may be used by itself or in combination with one or more other aspects, the surface cleaning apparatus 100 includes a power level adjustment controller 220. When the second power pack 210 is provided, additional on board power is available. The additional power provided by the second power pack 210 may be used to increase the run time of the surface cleaning apparatus 100 to increase the operating power provided to the suction motor in one or more of the operating modes of the suction motor and/or 100 to increase the operating power provided to the brush motor in one or more of the operating modes of the brush motor. The power level adjustment controller 220 is operable to adjust an operating power level provided to the suction motor 160 and/or the brush motor 144 (in one or more of the operating modes of the motor), when the second power pack 210 is provided. An advantage of this aspect is the provision of a higher level of on board power to the surface cleaning apparatus 100 enables the user to optionally select whether to use the additional on board power to extend the operational run time of the surface cleaning apparatus, to increase the operating power level of the suction motor 160 and/or the brush motor 144 or both. Adjusting the operating power levels may improve the cleaning efficacy of the surface cleaning apparatus 100, while also allowing the user to control the rate of power consumption. As described previously, each the suction motor 160 and the brush motor 144 may be operable in a single power mode or a plurality of operating modes, such as a low mode of operation and a high mode of operation.

The provision of the second power pack 210 may enable the power level adjustment controller 220 to be operable such that the user can adjust the operating power level provided to the suction motor 160 and/or the brush motor 144 in the low mode of operation and/or the high mode of operation. In other words, the user may adjust operating power of either the low mode of operation, the high mode of operation, or both modes of operation.

As described previously, the suction motor 160 produces a low rate of flow in the low mode of operation and high rate of flow in the high mode of operation. When the second power pack 210 is provided, the low rate of flow and/or the high rate of flow may be adjustable by the user through use of the power level adjustment controller 220. For example, the provision of the second power pack 210 may enable the power level adjustment controller 220 to adjust the high flow rate but may not enable adjustment of the low flow rate. Alternately, the provision of the second power pack 210 may enable the power level adjustment controller 220 to adjust both the low flow rate and the high flow rate.

Similarly, the power level adjustment controller 220 may be used to adjust each rate of motion of the moveable brush member 146. It will be appreciated that the power level adjustment controller 220 may be used to adjust one of the low speed mode and the high speed mode or both the low speed mode and the high speed mode.

It will be appreciated that the power level controller 220 may be a mechanical control (e.g., a rotary dial or a slide switch) or a digital control. The power level controller may be operable between two positions (e.g., the power level adjustment controller 220 may enable the user to adjust the power level of the different modes of operation to a single, higher level of operation) or may enable the user to adjust the discrete amount by which the operating power level is increased or the power level controller may be infinitely adjustable. As exemplified in FIG. 18, the power level adjustment controller 220 is adjustable between a 4 different positions, namely 25%, 50%, 75% and 100%. Each position may be for all operating levels of one or both of the suction motor and the brush motor. For example, if the user selects the 25% position, then in each of the operating positions of the brush motor and the suction motor (e.g., suction motor on low mode, suction motor on high mode, brush motor on low mode, brush motor on high mode), the power provided to the motor may be increased by 25%. Accordingly, the user may then selectively adjust an amount by which the operating power level is increased by adjusting the power level adjustment controller 220 through each of the plurality of positions.

Alternately, the user may select that the power level controller 220 adjusts the power level to one of the brush motor and the suction motor. Accordingly, the user may select which motor has the power level adjusted and the user may then set the level of increase provided to that motor. It will be appreciated that a user may first select the suction motor and adjust the power level and may then select the brush motor and may then select the power level, which may be different to the power level selected for the brush motor.

Alternately, a user may be able to select the power level provide for a particular operating mode of one or both of the suction motor and the brush motor. A user may therefore select, for example, the high mode of operation of the suction motor, and increase the operating power by 25%, 50%, 75%, or 100% for that operating mode of the suction motor.

It will be appreciated that the increment of increase between each of the plurality of positions may vary.

Similarly, the power level adjustment controller 220 may be used to enable the user to adjust the power level of the different modes of operation to a decreased operating power level. Decreasing the operating power level may increase the run time of the surface cleaning apparatus 100 due to the slower depletion of the first power pack 200 and/or the second power pack 210. It will be appreciated that the power level controller 220 may be operable to decrease one or more operating power levels of the suction motor and/or the brush motor when the first power pack 200 is provided.

The surface cleaning apparatus may also provide information to a user advising of the run time available based on the power pack provided and the operating mode selected. Accordingly, a user will be able to determine the run time of the surface cleaning apparatus 100 based on, e.g., if the brush motor is actuated and, if so, the mode of operation of the brush motor and the operating mode of the suction motor. It will be appreciated that the estimated run times will increase when the higher level of on board power is provided by the second power pack 210. It will be appreciated that adjusting the power level using the power level controller 220 will adjust the run time. Therefore, when a user elects to, e.g., increase the power level provided to the suction motor, the run time of the surface cleaning apparatus using the on board power will decrease. Therefore, using the power level adjustment controller 220 in conjunction with an information display, the user may control the run time of the surface cleaning apparatus 100.

For example, the digital user interface 180 may provide run time and power level information to the user. When the second power pack 210 is provided, the power level adjustment controller 220 may be selectively operated by the user to adjust the power level and/or the run time. Adjusting the power level to a higher operating power level will result in more rapid depletion of the first power pack 200 and/or the second power pack 210. More rapid depletion of the power packs will result in reduced run time, while resulting in increased operating power. Similarly, reducing the operating power level will result in a slower depletion of the first power pack 200 and/or the second power pack 210. Slower depletion of the power packs will result in increased run time, while resulting in decreased operating power. Accordingly, when the second power pack 210 is provided, the user may operate the power level adjustment controller 220 to accommodate their cleaning needs. For example, if the user is cleaning a surface with minimal dirt and/or debris, less operating power may be required to sufficiently clean the surface, so the user may increase the run time of the surface cleaning apparatus 100 by reducing the operating power level. Alternately, if the user is cleaning a surface with large amounts of dirt and/or debris, more operating power may be required to sufficiently clean the surface, so the user may decrease the run time of the surface cleaning apparatus 100 by increasing the operating power level.

It will be appreciated that if the surface cleaning apparatus provides run time information to a user, then the power level controller 220 may be operable by a user when the first power pack 200 is provided.

It will also be appreciated that the digital user interface 180 may be operable to enable a user to select a desired run time, in which case the power level controller 220 may be automatically adjusted by, e.g., a controller, to adjust one or more power levels provided to the brush motor and/or the suction motor to enable the surface cleaning apparatus to have the selected run time. Optionally, the user may be able to select which motor and/or which power level is adjusted to achieve the selected run time.

Additional Alternate Modes

While the exemplary embodiments described above are in reference to various flow modes and brush motor modes enabled by the provision of the second power pack 210, it will be appreciated that the provision of the second power pack 210 may enable any feature in the surface cleaning apparatus 100 that requires a second level of on board power. For example, the provision of the second power pack 210 may enable, including, but not limited to, an ionizer system, a deodorization system (e.g., an ozonation system), a UV light, a wireless communication system for communication with an external device, a touch screen, an accelerometer for tracking the position of the surface cleaning apparatus, and/or a dirt sensor for detecting the level of dirt on the surface to be cleaned.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Clause Set A

1. A surface cleaning apparatus comprising:
   (a) a surface cleaning head having a dirty air inlet, a moveable brush member and a brush motor drivingly connected to the moveable brush member;
   (b) an air flow path from the dirty air inlet to a clean air outlet with an air treatment member and a suction motor provided in the air flow path;
   (c) a suction motor actuator that is operable to actuate the suction motor; and,
   (d) a brush motor actuator that is operable to actuate a first mode of operation of the brush motor,
      wherein when a first power pack is provided, the first power pack provides a first level of on board power that is available to power the surface cleaning apparatus, and
      wherein when a second power pack is provided, a second level of on board power is available to power the surface cleaning apparatus, the second level of on board power is greater than the first level of on board power, and
      wherein the brush motor actuator is operable when the first power pack is provided to power the surface cleaning apparatus and the brush motor actuator is not enabled to actuate the first mode of operation until the second power pack is provided to power the surface cleaning apparatus.
2. The surface cleaning apparatus of clause 1 wherein the first mode of operation is an on position whereby when the second power pack is provided to power the surface cleaning apparatus and the brush motor actuator is operated to actuate the first mode of operation, the moveable brush member is actuated to move.
3. The surface cleaning apparatus of clause 2 wherein the brush motor actuator is a mechanical switch that is moveable between an off position and the on position in which a first level of power is provided to the brush motor and the brush motor actuator is moveable to the on position once the second power pack is provided to power the surface cleaning apparatus.
4. The surface cleaning apparatus of clause 3 wherein provision of the second power pack unlocks the brush motor actuator whereby the brush motor actuator is moveable to the on position.
5. The surface cleaning apparatus of clause 1 wherein the brush motor actuator is also operable to actuate a second mode of operation of the brush motor wherein the second mode of operation is a low speed of movement of the moveable brush member and the first mode of operation is a high speed of movement of the moveable brush member and the brush motor actuator is operable to actuate the second mode of operation when the second power pack is provided to power the surface cleaning apparatus.
6. The surface cleaning apparatus of clause 5 wherein the brush motor actuator is a mechanical switch that is moveable between an off position, a first mode of operation on position in which a first level of power is provided to the brush motor and a second mode of operation on position in which a second level of power is provided to the brush motor, the first level of power is greater than the second level of power, and the brush motor actuator is moveable to the first mode of operation on position once the second power pack is provided to power the surface cleaning apparatus.
7. The surface cleaning apparatus of clause 6 wherein provision of the second power pack unlocks the brush motor actuator whereby the brush motor actuator is moveable to the first mode of operation on position.
8. The surface cleaning apparatus of clause 1 further comprising a digital user interface, the digital interface includes the brush motor actuator, and the brush motor actuator is operable to actuate the first mode of operation once the second power pack is provided to power the surface cleaning apparatus.
9. The surface cleaning apparatus of clause 5 further comprising a digital user interface, the digital interface includes the brush motor actuator, and the brush motor actuator is operable to actuate the first and second modes of operation wherein:
 (a) when the brush motor actuator is pressed a first time and either the first or the second power pack is provided to power the surface cleaning apparatus, the second mode of operation is actuated, and
 (b) when the brush motor actuator is pressed a second time and the second power pack is provided to power the surface cleaning apparatus, the first mode of operation is actuated, and the first mode of operation is only actuatable when the second power pack is provided.
10. The surface cleaning apparatus of clause 9 wherein the brush motor actuator comprises a first actuation portion of the user interface corresponding to the first mode of operation and a second actuation portion of the user interface corresponding to the second mode of operation, and the first actuation portion is not illuminated until the second power pack is provided to power the surface cleaning apparatus.
11. The surface cleaning apparatus of clause 1 wherein the second power pack is removably receivable in the surface cleaning apparatus.
12. The surface cleaning apparatus of clause 1 wherein the second power pack is removably receivable in the surface cleaning apparatus while the first power pack is provided to power the surface cleaning apparatus.
13. The surface cleaning apparatus of clause 12 wherein the second power pack provides a third level of on board power that is less than the first level of on board power.
14. The surface cleaning apparatus of clause 1 wherein the surface cleaning apparatus has a power pack docking station and the power pack docking station alternately removably receives the first power pack and the second power pack.
15. The surface cleaning apparatus of clause 14 wherein the second power pack provides the second level of on board power.
16. The surface cleaning apparatus of clause 1 further comprising a controller that enables the first mode of operation when the second power pack is provided to power the surface cleaning apparatus.

Clause Set B

1. A surface cleaning apparatus having an air flow path from a dirty air inlet to a clean air outlet with an air treatment member and a suction motor provided in the air flow path, the surface cleaning apparatus has a suction motor actuator, and the suction motor actuator is actuatable to actuate the suction motor to operate in a low mode of operation and to operate in a high mode of operation,
 wherein when a first power pack is provided, the first power pack provides a first level of on board power that is available to power the surface cleaning apparatus, and
 wherein when a second power pack is provided, a second level of on board power is available to power the surface cleaning apparatus, the second level of on board power is greater than the first level of on board power, and
 wherein each of the low and high modes of operation are enabled when the first power pack is provided to power the surface cleaning apparatus and when the second power pack is provided to power the surface cleaning apparatus, and
 when the second power pack is provided to power the surface cleaning apparatus, an operating power level provided to the suction motor during at least one of the low and high modes of operation is increased.
2. The surface cleaning apparatus of clause 1 wherein, when the second power pack is provided to power the surface cleaning apparatus, the operating power level provided to the suction motor during each of the low and high modes of operation is increased.
3. The surface cleaning apparatus of clause 1 wherein, when the first power pack is provided to power the surface cleaning apparatus, the suction motor produces a low rate of flow in the low mode of operation and suction motor produces a high rate of flow in the high mode of operation, and when the second power pack is provided to power the surface cleaning apparatus, at least one of the low rate of flow and the high rate of flow is automatically increased.
4. The surface cleaning apparatus of clause 1 wherein, when the first power pack is provided to power the surface cleaning apparatus, the suction motor produces a low rate of flow in the low mode of operation and suction motor produces a high rate of flow in the high mode of operation, and when the second power pack is provided to power the surface cleaning apparatus, each of the low rate of flow and the high rate of flow is automatically increased.
5. The surface cleaning apparatus of clause 1 wherein the second power pack is removably receivable in the surface cleaning apparatus.
6. The surface cleaning apparatus of clause 1 wherein the second power pack is removably receivable in the surface cleaning apparatus while the first power pack is provided to power the surface cleaning apparatus.
7. The surface cleaning apparatus of clause 6 wherein the second power pack provides a third level of on board power that is less than the first level of on board power.
8. The surface cleaning apparatus of clause 1 wherein the surface cleaning apparatus has a power pack docking station and the power pack docking station alternately removably receives the first power pack and the second power pack.
9. The surface cleaning apparatus of clause 8 wherein the second power pack provides the second level of on board power.
10. The surface cleaning apparatus of clause 1 further comprising a controller that enables the operating power level provided to the suction motor during at least one of the low and high modes of operation to be increased when the second power pack is provided to power the surface cleaning apparatus.
11. A surface cleaning apparatus comprising:
  (a) a surface cleaning head having a dirty air inlet, a moveable brush member and a brush motor drivingly connected to the moveable brush member;
  (b) an air flow path from the dirty air inlet to a clean air outlet with an air treatment member and a suction motor provided in the air flow path;
  (c) a suction motor actuator that is operable to actuate the suction motor; and,
  (d) a brush motor actuator that is operable to actuate a low speed mode of operation of the brush motor and to actuate a high speed mode of operation of the brush motor,
    wherein when a first power pack is provided, the first power pack provides a first level of on board power that is available to power the surface cleaning apparatus, and
    wherein when a second power pack is provided, a second level of on board power is available to power the surface cleaning apparatus, the second level of on board power is greater than the first level of on board power, and
    wherein each of the low and high speed modes of operation are enabled when the first power pack is provided to power the surface cleaning apparatus and when the second power pack is provided to power the surface cleaning apparatus, and when the second power pack is provided to power the surface cleaning apparatus, an operating power level provided to the brush motor during at least one of the low and high speed modes of operation is increased.
12. The surface cleaning apparatus of clause 11 wherein, when the second power pack is provided to power the surface cleaning apparatus, the operating power level provided to the brush motor during each of the low and high speed modes of operation is increased.
13. The surface cleaning apparatus of clause 11 wherein, when the second power pack is provided to power the surface cleaning apparatus, a speed of movement of the moveable brush member in at least one of the low speed mode of operation and the high speed mode of operation is automatically increased.
14. The surface cleaning apparatus of clause 11 wherein, when the second power pack is provided to power the surface cleaning apparatus, a speed of movement of the moveable brush member in each of the low speed mode of operation and the high speed mode of operation is automatically increased.
15. The surface cleaning apparatus of clause 11 wherein the second power pack is removably receivable in the surface cleaning apparatus.
16. The surface cleaning apparatus of clause 11 wherein the second power pack is removably receivable in the surface cleaning apparatus while the first power pack is provided to power the surface cleaning apparatus.
17. The surface cleaning apparatus of clause 16 wherein the second power pack provides a third level of on board power that is less than the first level of on board power.
18. The surface cleaning apparatus of clause 11 wherein the surface cleaning apparatus has a power pack docking station and the power pack docking station alternately removably receives the first power pack and the second power pack.
19. The surface cleaning apparatus of clause 18 wherein the second power pack provides the second level of on board power.
20. The surface cleaning apparatus of clause 1 further comprising a controller that enables the operating power level provided to the brush motor during at least one of the low speed mode of operation and the high speed mode of operation to be increased when the second power pack is provided to power the surface cleaning apparatus.

Clause Set C

1. A surface cleaning apparatus having an air flow path from a dirty air inlet to a clean air outlet with an air treatment member and a suction motor provided in the air flow path, the surface cleaning apparatus has a suction motor actuator, and the suction motor actuator is actuatable to actuate the suction motor to operate in a low mode of operation and to operate in a high mode of operation,
  wherein when a first power pack is provided, the first power pack provides a first level of on board power that is available to power the surface cleaning apparatus, and
  wherein when a second power pack is provided, a second level of on board power is available to power the surface cleaning apparatus, the second level of on board power is greater than the first level of on board power, and
  wherein each of the low and high modes of operation are enabled when the first power pack is provided to power the surface cleaning apparatus and when the second power pack is provided to power the surface cleaning apparatus, and
  wherein a power level adjustment controller is provided and, when the second power pack is provided to power the surface cleaning apparatus, the power level adjustment controller is adjustable by a user whereby an operating power level provided to the suction motor during at least one of the low and high modes of operation is adjustable by the user.
2. The surface cleaning apparatus of clause 1 wherein, when the second power pack is provided to power the surface cleaning apparatus, the operating power level provided to the suction motor during each of the low and high modes of operation is adjustable by the user.
3. The surface cleaning apparatus of clause 1 wherein, when the first power pack is provided to power the surface cleaning apparatus, the suction motor produces a low rate of flow in the low mode of operation and suction motor produces a high rate of flow in the high mode of operation, and when the second power pack is provided to power the surface cleaning apparatus, at least one of the low rate of flow and the high rate of flow is adjustable by the user.
4. The surface cleaning apparatus of clause 1 wherein, when the first power pack is provided to power the surface cleaning apparatus, the suction motor produces a low rate of flow in the low mode of operation and suction motor produces a high rate of flow in the high mode of operation, and when the second power pack is provided to power the surface cleaning apparatus, each of the low rate of flow and the high rate of flow is adjustable by the user.
5. The surface cleaning apparatus of clause 1 wherein the power level adjustment controller is adjustable between a plurality of positions whereby the user may selectively adjust an amount by which the operating power level is increased.
6. The surface cleaning apparatus of clause 5 further comprising a user interface which provides run time and power level information to the user whereby, when the second power pack is provided to power the surface cleaning apparatus, the power level adjustment controller is selectively operably by the user to adjust at least one of the power level and the run time.
7. The surface cleaning apparatus of clause 1 wherein the second power pack is removably receivable in the surface cleaning apparatus.
8. The surface cleaning apparatus of clause 1 wherein the second power pack is removably receivable in the surface cleaning apparatus while the first power pack is provided to power the surface cleaning apparatus.
9. The surface cleaning apparatus of clause 8 wherein the second power pack provides a third level of on board power that is less than the first level of on board power.
10. The surface cleaning apparatus of clause 1 wherein the surface cleaning apparatus has a power pack docking station and the power pack docking station alternately removably receives the first power pack and the second power pack.
11. The surface cleaning apparatus of clause 10 wherein the second power pack provides the second level of on board power.
12. A surface cleaning apparatus comprising:
 (a) a surface cleaning head having a dirty air inlet, a moveable brush member and a brush motor drivingly connected to the moveable brush member;
 (b) an air flow path from the dirty air inlet to a clean air outlet with an air treatment member and a suction motor provided in the air flow path;
 (c) a suction motor actuator that is operable to actuate the suction motor; and,
 (d) a brush motor actuator that is operable to actuate a low speed mode of operation of the brush motor and to actuate a high speed mode of operation of the brush motor, the brush motor produces a low speed rate of motion of the moveable brush member in the low speed mode of operation and brush motor produces a high speed rate of motion of the moveable brush member in the high speed mode of operation
 wherein when a first power pack is provided, the first power pack provides a first level of on board power that is available to power the surface cleaning apparatus, and
 wherein when a second power pack is provided, a second level of on board power is available to power the surface cleaning apparatus, the second level of on board power is greater than the first level of on board power, and
 wherein each of the low speed and high speed modes of operation are enabled when the first power pack is provided to power the surface cleaning apparatus and when the second power pack is provided to power the surface cleaning apparatus, and
 wherein a power level adjustment controller is provided and, when the second power pack is provided to power the surface cleaning apparatus, the power level adjustment controller is adjustable by a user whereby an operating power level provided to the brush motor during at least one of the low speed and high speed modes of operation is adjustable by the user.
13. The surface cleaning apparatus of clause 12 wherein, when the second power pack is provided to power the surface cleaning apparatus, the operating power level provided to the brush motor during each of the low speed and high speed modes of operation is adjustable by the user.
14. The surface cleaning apparatus of clause 12 wherein, when the second power pack is provided to power the surface cleaning apparatus, each of the low speed rate of motion and the high speed rate of motion is adjustable by the user.
15. The surface cleaning apparatus of clause 12 wherein the power level adjustment controller is adjustable between a plurality of positions whereby the user may selectively adjust an amount by which the operating power level is increased.
16. The surface cleaning apparatus of clause 15 further comprising a user interface which provides run time and power level information to the user whereby, when the second power pack is provided to power the surface cleaning apparatus, the power level adjustment controller is selectively operably by the user to adjust at least one of the power level and the run time.
17. The surface cleaning apparatus of clause 12 wherein the second power pack is removably receivable in the surface cleaning apparatus.
18. The surface cleaning apparatus of clause 12 wherein the second power pack is removably receivable in the surface cleaning apparatus while the first power pack is provided to power the surface cleaning apparatus.
19. The surface cleaning apparatus of clause 18 wherein the second power pack provides a third level of on board power that is less than the first level of on board power.
20. The surface cleaning apparatus of clause 20 wherein the surface cleaning apparatus has a power pack docking station and the power pack docking station alternately removably receives the first power pack and the second power pack.
21. The surface cleaning apparatus of clause 20 wherein the second power pack provides the second level of on board power.

The invention claimed is:

1. A surface cleaning apparatus having
an air flow path extending from a dirty air inlet to a clean air outlet with an air treatment member and a suction motor provided in the air flow path,
the surface cleaning apparatus has a suction motor actuator, the suction motor actuator is actuatable to actuate the suction motor,
wherein when a first power pack is provided, the first power pack provides a first level of on board power that is available to power the surface cleaning apparatus and the suction motor actuator is actuatable to actuate the suction motor to operate in a first mode of operation defining a first discrete power level for the suction motor, and
wherein when a second power pack is provided, a second level of on board power is available to power the surface cleaning apparatus, the second level of on board power is greater than the first level of on board power and the suction motor actuator is actuatable to actuate the suction motor to operate in a second mode of operation defining a second discrete power level for the suction motor, and
wherein the suction motor actuator is only accessible to actuate the suction motor to operate in a second mode of operation when the second power pack is provided whereby, when the second power pack is provided, the suction motor actuator is operable to actuate the suction motor to operate in the second mode of operation.

2. The surface cleaning apparatus of claim 1 wherein the second power pack is removably receivable in the surface cleaning apparatus.

3. The surface cleaning apparatus of claim 1 further comprising a controller that enables the second mode of operation when the second power pack is provided to power the surface cleaning apparatus.

4. The surface cleaning apparatus of claim 1 wherein the first mode of operation is a low flow mode and the second mode of operation is high flow mode.

5. The surface cleaning apparatus of claim 4 wherein the first mode of operation further comprises a medium flow mode between the low flow mode and the high flow mode.

6. The surface cleaning apparatus of claim 1 wherein the second power pack is removably receivable in the surface cleaning apparatus while the first power pack is provided to power the surface cleaning apparatus.

7. The surface cleaning apparatus of claim 6 wherein the second power pack provides a third level of on board power that is less than the first level of on board power.

8. The surface cleaning apparatus of claim 1 wherein the surface cleaning apparatus has a power pack docking station and the power pack docking station alternately removably receives the first power pack and the second power pack.

9. The surface cleaning apparatus of claim 8 wherein the second power pack provides the second level of on board power.

10. The surface cleaning apparatus of claim 1 wherein the suction motor actuator is a mechanical switch that is moveable between an off position, a first on position in which the first discrete level of power is provided to the suction motor and a second on position in which the second discrete level of power is provided to the suction motor, the second discrete level of power is greater than the first discrete level of power.

11. The surface cleaning apparatus of claim 10 wherein a mechanical member is moveable from a locked position in which the mechanical switch is inhibited from moving to the second on position and an unlocked position in which the mechanical switch is moveable to the second on position and the mechanical member is moveable to unlocked position when the second power pack is provided to power the surface cleaning apparatus.

12. The surface cleaning apparatus of claim 11 wherein insertion of the second power pack drivingly moves the mechanical member unlocked position.

13. The surface cleaning apparatus of claim 1 further comprising a digital user interface, the digital interface includes the suction motor actuator, and the suction motor actuator is operable to actuate the first and second modes of operations.

14. The surface cleaning apparatus of claim 13 wherein suction motor actuator is an area on the digital user interface and wherein:
(a) when the area is pressed a first time and the first power pack is provided to power the surface cleaning apparatus, the first mode of operation is actuated, and
(b) when the area is pressed a second time and the second power pack is provided to power the surface cleaning apparatus, the second mode of operation is actuated.

15. The surface cleaning apparatus of claim 14 wherein the first mode of operation is a low flow mode and the second mode of operation is high flow mode.

16. The surface cleaning apparatus of claim 13 wherein the digital user interface comprises a first actuation portion of the digital user interface and a second actuation portion of the digital user interface, and the second actuation portion is not illuminated until the second power pack is provided to power the surface cleaning apparatus.

17. The surface cleaning apparatus of claim 16 wherein the first mode of operation is a low flow mode that is actuated when the first actuation portion is operated by a user and the second mode of operation is high flow mode that is actuated when the second actuation portion is operated by the user.

* * * * *